United States Patent
Numako

[19]
[11] Patent Number: 5,809,345
[45] Date of Patent: Sep. 15, 1998

[54] PROGRAMMABLE ELECTRONIC DEVICE

[75] Inventor: Norio Numako, Tokyo, Japan

[73] Assignee: Asahi Kogaku Kogyo Kabushiki Kaisha, Tokyo, Japan

[21] Appl. No.: 878,670

[22] Filed: Jun. 20, 1997

Related U.S. Application Data

[63] Continuation of Ser. No. 623,394, Mar. 27, 1996, abandoned.

[30] Foreign Application Priority Data

| | | | |
|---|---|---|---|
| Mar. 31, 1995 | [JP] | Japan | 7-100478 |
| Mar. 31, 1995 | [JP] | Japan | 7-100479 |

[51] Int. Cl.$^6$ .................................................. G03B 17/00
[52] U.S. Cl. ........................................... 396/48; 396/439
[58] Field of Search ............................... 396/48, 310, 439

[56] References Cited

U.S. PATENT DOCUMENTS

| | | | |
|---|---|---|---|
| 5,132,716 | 7/1992 | Samuels et al. | 354/322 |
| 5,164,836 | 11/1992 | Jackson et al. | 354/471 |
| 5,300,978 | 4/1994 | Miyasaka | 354/412 |
| 5,371,691 | 12/1994 | Seki et al. | 354/416 |
| 5,453,805 | 9/1995 | Itoh | 354/106 |
| 5,479,228 | 12/1995 | Tamamura et al. | 354/106 |
| 5,500,701 | 3/1996 | Itoh | 354/106 |
| 5,502,830 | 3/1996 | Aihara | 354/289.12 |
| 5,561,493 | 10/1996 | Takahashi | 396/48 |
| 5,576,786 | 11/1996 | Katoh et al. | 396/133 |

*Primary Examiner*—Safet Metjahic
*Assistant Examiner*—Michael Dalakis
*Attorney, Agent, or Firm*—Greenblum & Bernstein, P.L.C.

[57] ABSTRACT

An electronic device includes a first non-volatile memory for storing a control program for controlling an operation of the electronic device, and a second non-volatile memory for storing at least one modifying program for modifying the control program. The second non-volatile memory also stores modification information related to a modification of the control program. At least one predetermined portion of the control program can call a software modification management routine. The modification information is then read and the electronic device determines whether a modifying program to be executed is present in accordance with the modification information and address information, which indicates a current operating position of the control program, in response to the calling of the software modification management routine. The control program and the modifying program are then executed if the electronic device determines that the modifying program is present.

31 Claims, 21 Drawing Sheets

| MODE | STROBE | LOWER LIMIT | DISPLAY |
|---|---|---|---|
| AUTO – STROBE | Ev ≧ 10 OFF<br>Ev < 10 ON | Ev ≧ 10 | AUTO |
| STROBE – OFF | OFF | Ev ≧ 6 | 🚫⚡ |
| STROBE – ON | ON | Ev ≧ 10 | ⚡ |
| EXPOSURE COMPENSATION | Ev ≧ 6 | Ev ≧ 6 | ☀ → + 🚫⚡ |

FIG. 7

PROGRAMMABLE ELECTRONIC DEVICE

This application is a continuation, of application Ser. No. 08/623,394, filed Mar. 27, 1996, now abandoned.

BACKGROUND OF THE INVENTION

The present invention relates to an electronic device which has a single chip microprocessor, in which the program is changeable.

In a conventional electronic device having a single chip microprocessor (hereinafter referred to as microprocessor), a program for operating the microprocessor is stored in a non-volatile memory such as a ROM which is built into the microprocessor.

Presently, there are many electronic cameras being manufactured which employ a microprocessor to control the operation of different functions and features. The use of the microprocessor reduces the overall size and complexity of the camera. However, if the program needs to be changed to fix software errors or to provide new software features, the entire microprocessor must be changed. This is an expensive and time consuming process.

SUMMARY OF THE INVENTION

It is therefore an object of the present invention to provide an improved electronic device having a single chip microprocessor in which the program used to operate the microprocessor can be easily updated.

It is another object of the present invention to provide an improved electronic camera having a single chip microprocessor in which the program used to operate the microprocessor can be easily updated.

According to a first aspect of the present invention, there is provided an electronic device including a first non-volatile memory for storing a control program for controlling an operation of the electronic device, and a second non-volatile memory for storing at least one modifying program for modifying the control program. The second non-volatile memory also stores modification information related to a modification of the control program. At least one predetermined portion of the control program can call a software modification management routine. The modification information is then read and the electronic device determines whether a modifying program to be executed is present in accordance with the modification information and address information, which indicates a current operating position of the control program, in response to the calling of the software modification management routine. The control program and the modifying program are then executed if the electronic device determined that the modifying program is present.

Therefore, according to the present invention, if a modifying program has been added to the electronic device by updating a non-volatile memory such as an EEPROM, the original program can call the modifying program by using a software management routine and modification information provided with the modifying program. This allows easy updating of the software without the need to change the original program or the ROM which has the original program.

In the preferred embodiment, the modification information includes modifying program position information which is related to a position at which the modifying program is added. Thus, the electronic device determines that the corresponding modifying program is present if an address indicated by the modifying program position information is coincident with the address of the address information.

Preferably, the electronic device further includes a third rewritable memory capable of storing the modification information and the modifying program. In the preferred embodiment, the third rewritable memory includes a RAM.

Optionally, the electronic device further determines whether the modifying programs are resident data or non-resident data. The resident data are then copied to the third rewritable memory during an initialization routine of the electronic device.

Thus, by copying the resident data into the RAM during the initialization routine, the electronic device can execute the modified programs immediately when required.

Further, since some of the modifying programs may be non-resident, the size of the RAM can be minimized to store only the resident programs. Thus, when a control program that is modified using a non-resident modifying program is to be activated, the non-resident data is copied into the RAM and then the control program and the corresponding modifying program are executed.

Optionally, the address information includes a return address for returning to the control program after the modification management routine is executed. In the preferred embodiment, the return address is stored in a stack of the RAM.

Further optionally, the software modification management routine can be called from the various control programs and from different locations of the control programs. Therefore, a single software management program can be called by all the control programs, and further, the single software management program can call the modifying program that corresponds to the control program to be executed. This reduces the size of the software needed to execute the control programs.

In the case that the control program calls the software management routine, the return address is stored in a first level of the stack. However, if one of the modifying programs calls the software management routine, then the return address is stored in a second level of the stack.

Still optionally, the modifying program is capable of designating a return address, and the software modification management routine is capable of changing the return address in accordance with the return address designated by the modifying program. Therefore, when the control program calls the modifying program, the portions of the original control program that are not required to be executed can be omitted.

In the preferred embodiment, the electronic device prohibits the modifying program from being re-executed while the modifying program is being executed. Therefore, if the modifying program is repeatedly activated, the electronic device forces the modifying program to return to the control program after the modifying program has been executed once.

Further, in the preferred embodiment, the modifying program is used to fix errors in the control program, or alternatively, to add new features to the control program.

According to a second aspect of the present invention, there is provided an electronic device which includes a first non-volatile memory for storing a plurality of control programs of the electronic device and a second non-volatile memory for storing at least one modifying program for modifying at least one of the plurality of control programs.

The second non-volatile memory also stores modification information related to the modifying program. The electronic device also includes a third rewritable memory. The modifying program and the modification information are divided into resident and non-resident data. The electronic device determines whether a modifying program is resident data or non-resident data, and copies the resident data from the second non-volatile memory to the third memory. The electronic device then executes the plurality of control programs and at least one modifying program, where the modifying program is executed at a predetermined position in at least one of the plurality of control programs, and is executed immediately in response to a determination that the modifying program is resident data. If the electronic device determines that the modifying program is non resident data, then the modifying program is first copied from the second non-volatile memory to the third rewritable memory before the modifying program is executed.

Therefore, if the control program calls a modifying program that is resident data, the modifying program is executed immediately, since the data is stored in the third rewritable memory.

According to a third aspect of the present invention, there is provided an electronic device including a first non-volatile memory for storing control programs of the electronic device, and a second non-volatile memory for storing a plurality of modifying programs for modifying the control programs. The control programs call a modification management routine from at least one location of the control programs. The second non-volatile memory stores modification information related to the modifying programs, with the modifying programs and the modification information being divided into resident and non-resident data. At least one software modification management routine is stored in the first non-volatile memory and the second non-volatile memory. The electronic device also includes a third rewritable memory. The electronic device can copy the resident data and the non-resident data from the second non-volatile memory to the third memory. The electronic device determines that a modifying program is present based on the modification information and address information, with the address information indicating a current position of operation of the control program. The electronic device further determines whether the modifying program is the resident data or the non-resident data. The resident data is then read out of the second non-volatile memory and stored in the third rewritable memory. When the calling device calls the modification management routine, the electronic device determines whether the corresponding modifying program is the resident data or the non-resident data in response to the determination that a corresponding modification program is present. The electronic device executes at least the control programs and the modifying programs immediately in response to the corresponding modifying program being the resident data. If the corresponding modifying program is non-resident data then the corresponding modifying program is read out of the second non-volatile memory and written in the third memory in an area where the resident data is stored. The control program and the modifying program then executed.

According to a fourth aspect of the present invention, there is provided a method of updating a control program which controls an operation of an electronic device. The electronic device includes a first non-volatile memory for storing at least one control program and for storing a modification management routine called by at least one control program, and a second non-volatile memory for storing at least one modifying program for modifying at least one of the control programs, and for storing modification information related to a modification of the control program. This method includes the steps of:

reading the modification information;

determining whether a modifying program to be executed is present in accordance with the modification information read by the reading step, and address information which indicates a current operating position of the control program in response to the control program calling the modification management routine; and executing the control program and the modifying program in response to the determining step determining that the modifying program is present.

According to a fifth aspect of the present invention, there is provided a camera including a first non-volatile memory for storing a control program for controlling an operation of the electronic device, and a second non-volatile memory for storing at least one modifying program for modifying the control program. The second non-volatile memory also stores modification information related to a modification of the control program. At least one predetermined portion of the control program can call a software modification management routine. The modification information is then read and the camera determines whether a modifying program to be executed is present in accordance with the modification information and address information, which indicates a current operating position of the control program, in response to the calling of the software modification management routine. The control program and the modifying program are then executed if the camera determines that the modifying program is present.

BRIEF DESCRIPTION OF THE DRAWINGS

FIG. 7 shows a table of modes of operation of the electronically controlled camera shown in FIG. 1;

DESCRIPTION OF THE PREFERRED EMBODIMENTS

Figure 1:
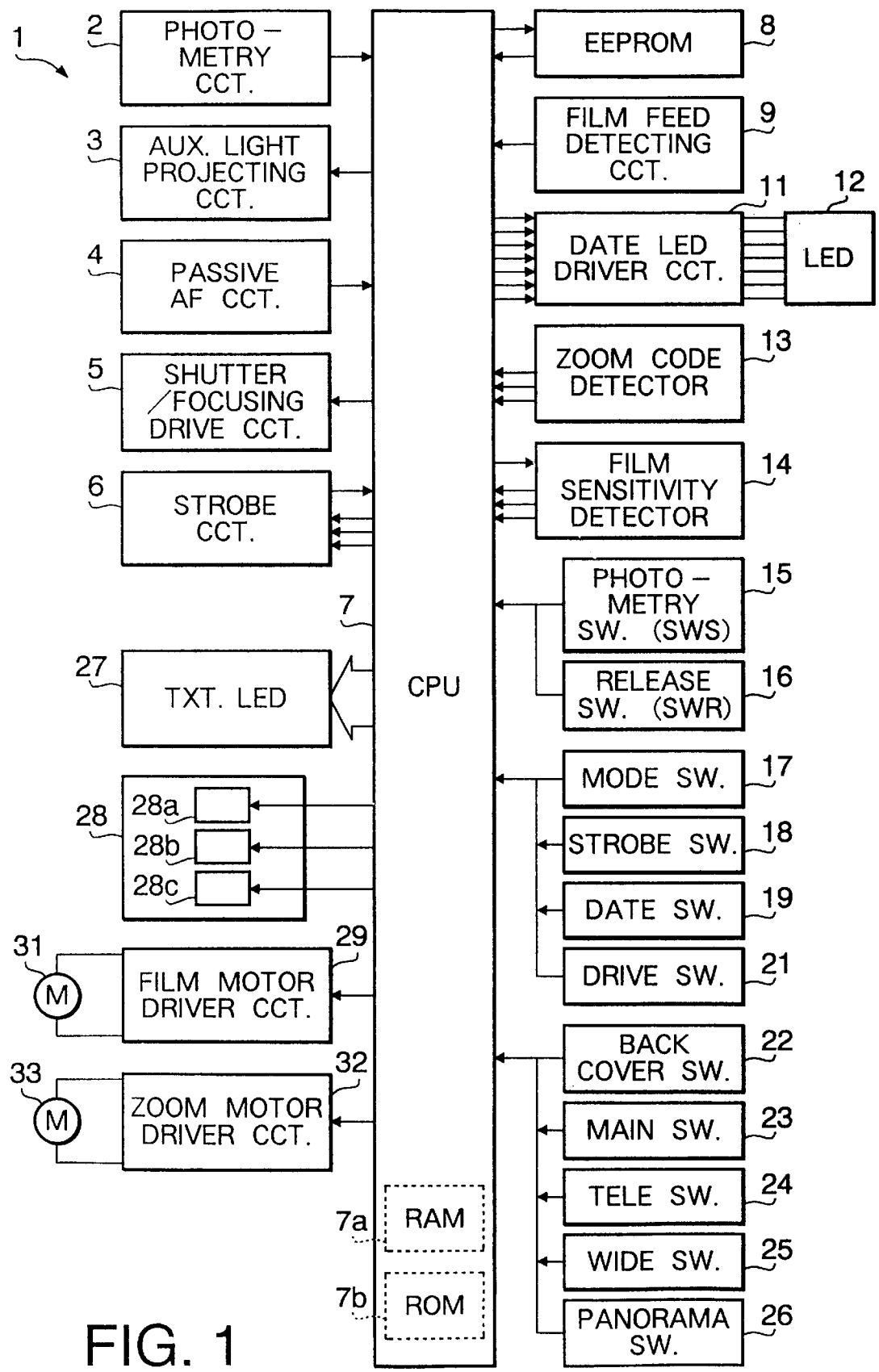
FIG. 1 shows a block diagram of an electronically controlled camera which embodies the present invention.

FIG. 1 shows a block diagram of an electronically controlled camera 1 (hereinafter referred to as camera 1) which embodies the present invention. The camera 1 has a photographing optical system (not shown) for forming an image on a film plane (not shown). A single chip microprocessor CPU 7 controls an operation of the camera 1.

The CPU 7 has an internal ROM 7b (i.e., non-volatile, non-rewritable memory) and an internal RAM 7a (i.e., a rewritable memory). The CPU 7 executes various camera operations including sequential control of the camera, a photometry operation, an automatic focusing operation and an exposure operation.

The block diagram shown in FIG. 1 will be explained in detail below.

A photometry circuit 2 measures a brightness of an image formed by the photographing optical system and transmits a brightness signal to the CPU 7. A film sensitivity detector 14 detects a DX code on a film cartridge and transmits a film sensitivity signal to the CPU 7. The film sensitivity detector 14 has a plurality of electrically conductive projections which are biased by coil springs to contact the film cartridge. The projections are linearly arranged along a direction of the film width.

The CPU 7 performs a photometric calculation based on the brightness signal transmitted by the photometry circuit 2 and the sensitivity signal transmitted by the sensitivity detector 14, in order to determine an appropriate aperture size and shutter speed.

An auxiliary light projecting circuit 3 projects light onto an object to be photographed in order for an automatic focusing operation to be performed.

The camera 1 has a passive AF unit (not shown) which includes a line sensor and a pupil dividing optical system. The pupil dividing optical system receives light reflected by an object to be photographed, and divides the received light into two light beams which are focused onto the line sensor. The line sensor has a plurality of linearly arranged light receiving elements, and outputs an image signal, corresponding to the received light, to a passive AF circuit 4. The passive AF circuit 4 determines an amount of shifting of the images with respect to an image forming position if the object was at a predetermined position (i.e., distance), and calculates the driving amount of the lens in order to form an in-focus image on the film plane. The calculated results are transmitted to the CPU 7.

The CPU 7 transmits a drive signal to a shutter/focus driving circuit 5, in accordance with the above calculation, in order to initiate the focusing of the lens. The shutter/focus driving circuit 5 drives a focusing lens in response to the above signal.

A strobe circuit 6 drives a strobe (not shown) to flash in response to the reception of a strobe drive command from the CPU 7. The strobe drive command is determined in response to the photometric calculation and a setting of a strobe mode (described later).

A film feed detection circuit 9 transmits a feeding signal to the CPU 7 when the film is being fed.

An LED driver circuit 11 drives an LED 12 to emit light in order to superimpose data indicating date and time on the film.

A zoom code detector 13 has a zoom code brush for detecting a zoom code corresponding to a focal length of a zoom lens. The zoom code detector 13 transmits information which indicates the focal length of the photographing lens to the CPU 7.

When the film is inserted in the film chamber, the projections of the film sensitivity detector 14 contact the DX code provided on the outside of the film cartridge. The film sensitivity is determined based on the conductive and non-conductive pattern of the DX code detected by the projections.

The camera 1 is further provided with a photometry switch 15 and a release switch 16. The photometry switch 15 is actuated by pressing a release button (not shown) halfway, while the release switch 16 is actuated by fully pressing the release button. The photometry switch 15 and the release switch 16 are momentary contact switches which are normally open.

When the photometry switch 15 is turned ON, the photometry circuit 2 and the passive AF circuit 4 are actuated by the CPU 7. When the release switch 16 is turned ON, the shutter/focusing drive circuit 5 is actuated to drive the focusing of the lens and to actuate the shutter in order to expose the film to light (i.e., to perform a photographing operation).

A mode setting operation is performed by operating a mode switch 17. By pressing the mode switch 17, the operation mode cycles amongst an automatic strobe mode, a strobe-off mode (i.e., always OFF), a strobe-on mode (i.e., always ON), and an exposure compensation mode.

When a strobe switch 18 is operated, a "red eye" prevention mode and a normal flash mode are switched.

"Red-eye" phenomena occurs when a strobe flash is close to a photographing lens. Since the pupils of the eyes of the photographing subject are usually relatively dilated, when the strobe flashes, a relatively large proportion of the flash light is reflected straight back to the photographing lens by the retinas of the subject. Since the retina is rich in blood vessels, the pupils of the eyes of the photographing subject appear to be red, giving the "red-eye" phenomena. In order to prevent the "red-eye" phenomena the strobe is flashed quickly before the exposure so that the pupils of the photographing subject contract. When the strobe is then flashed again during the exposure, the pupils of the subject have already been contracted and the red-eye phenomena is reduced.

In the normal mode, the flash is only actuated during the exposure of the film.

A date switch 19 is used to cycle between various date/time formats that can be superimposed on the film. The date/time format may be switched amongst the date given as year-month-date, the time, given as hours-minutes, and OFF, to which no data is superimposed on the film.

A drive switch 21, sets the camera 1 in a self-timer mode or a normal mode. In the self-timer mode, the exposure operation is delayed by a predetermined time interval (e.g. 10 seconds) after the release switch 16 has been turned ON. In the normal mode, the exposure operation is performed immediately after the release switch has been turned ON.

A back lid switch 22 is turned ON or OFF in response to a position of a back cover (not shown) of the camera 1. When the back cover is closed, the back lid switch 22 is turned ON, and when the back cover is open, the back lid switch 22 is turned OFF.

When a film cartridge is inserted in the film chamber and the back cover is closed, the back cover switch 22 is ON, and a film motor drive circuit 29 drives a film motor 31 to load the film onto a take-up spool (not shown).

After an exposure of the film has been taken, the film motor driving circuit 29 drives the motor 31 to wind the film by one frame.

If a zoom lever is displaced towards a tele side, a tele switch 24 is turned ON. Then a zoom motor driving circuit 32 drives a zoom motor 33 to move the lens towards the tele side while the tele switch 24 is ON. Conversely, if the zoom lever is displaced towards a wide side, a wide switch 25 is turned ON, and the zoom motor driving circuit 32 drives the zoom motor 33 to move the lens towards the wide side. A main switch 23 for selectively turning the camera OFF or ON is also provided.

A panorama switch 26 used to change the frame size to a panorama aspect ratio (i.e., vertical : horizontal of approximately 1:3). If the panorama switch 26 is turned OFF, the frame format is set to the normal aspect ratio (i.e., vertical : horizontal of approximately 2:3). However, if the panorama switch 26 is turned ON, then the frame format is set to the panorama aspect ratio.

In order to set the panorama aspect ratio, an upper and a lower portion of the normal film frame is shielded by light shielding plates.

An external LCD 27 displays information such as the mode of operation (i.e., one of the automatic strobe mode, the strobe-off mode, the strobe-on mode, and the exposure compensation mode), the frame format (i.e., normal or panorama), and the time/date etc.

A light unit 28 has a red lamp 28a which blinks when the strobe is being charged and which is continuously lit when the strobe is sufficiently charged. The light unit 28 further includes a green lamp 28b which is continuously lit if the distance of the object from the camera 1 detected by the passive AF circuit 4 is within a desirable range (i.e., 1.5 meters to ∞). The green lamp 28b blinks if the distance of the object from the camera 1 is outside the desirable range.

The light unit 28 also includes a self timer lamp 28c which is continuously or intermittently lit after the shutter button is depressed and before the exposure is taken when the self timer mode is selected.

An internal memory map of the CPU 7 and the EEPROM 8 will be described with reference to FIGS. 2 and 3.

Figure 2:
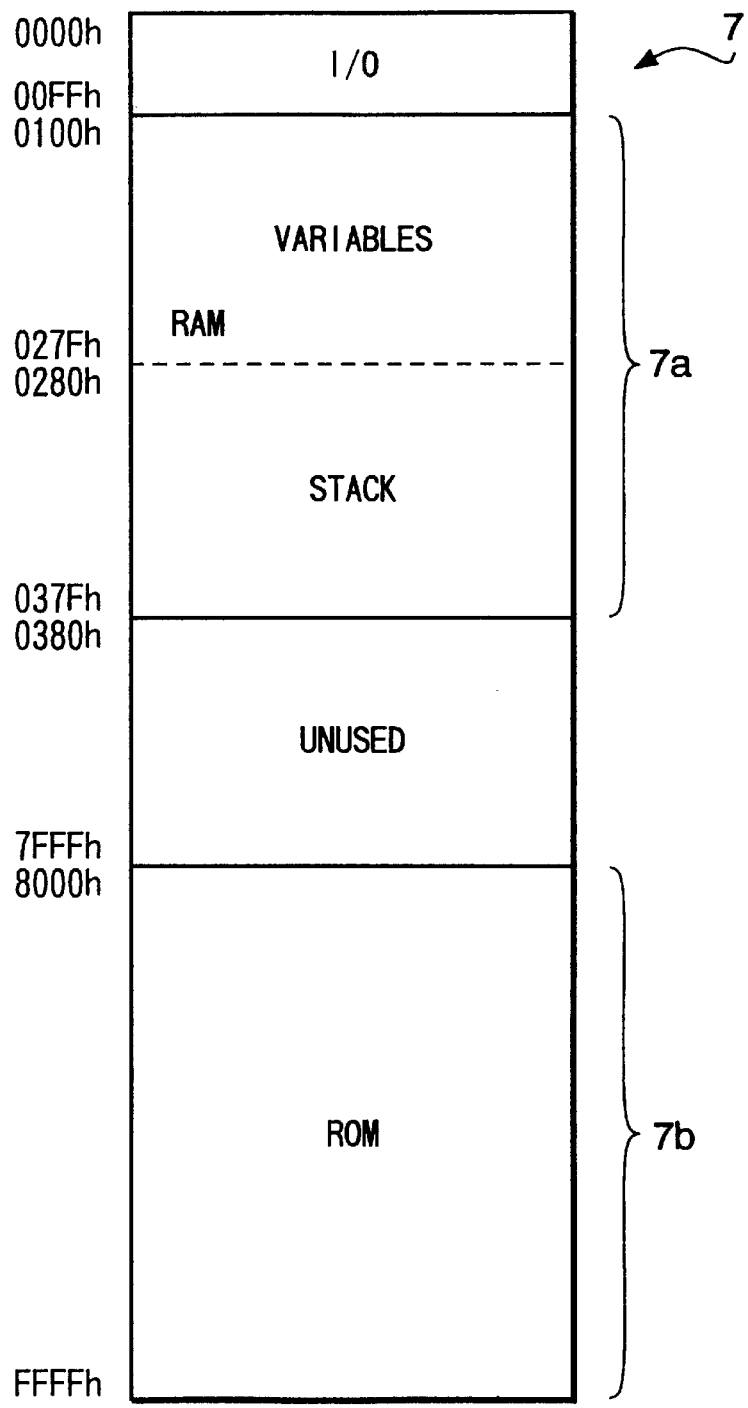
FIG. 2 shows a memory map of an address space of a microprocessor used in the electronically controlled camera shown in FIG. 1.

As shown in FIG. 2 the internal memory of the CPU 7 has three data storage areas: an I/O memory, the RAM 7a, and the ROM 7b. The I/O memory is allocated to the address range 0000h to 00FFh, the RAM 7a is allocated to the address range 0100h to 037Fh, while the ROM 7b is allocated the address range 8000h to FFFFh. The address range 0380h to 7FFFh is not used.

In the RAM 7a, the address range 0100h to 0280h is allocated for storing variables, while the address range 0280h to 037Fh is used for storing the results in a stack area. A portion of the stack area address range (i.e., 0280h to 02B7h) receives data from the EEPROM 8 when a reset process (described later) is performed. However, the address range of 0280h to 02B9h could be used if necessary. Thus, the addresses range 02BAh–037Fh is used for storing the results of operations (such as the steps of a software process), and other data (such as the return address of a subroutine, retracted variable data etc.) in the stack area. In the preferred embodiment, the area used for modifying the software of the camera 1 is a part of the stack area.

In the preferred embodiment, software routines for performing a reset process, a first modification management process, a second modification management process, a photometry process, a self wait process, a timer start process, a battery check process, a mode indication process and a main process are stored in the ROM 7b of the CPU 7.

The EEPROM 8 stores data for modifying the camera software (i.e., the processes mentioned above) to be executed by the CPU 7.

Figure 3:
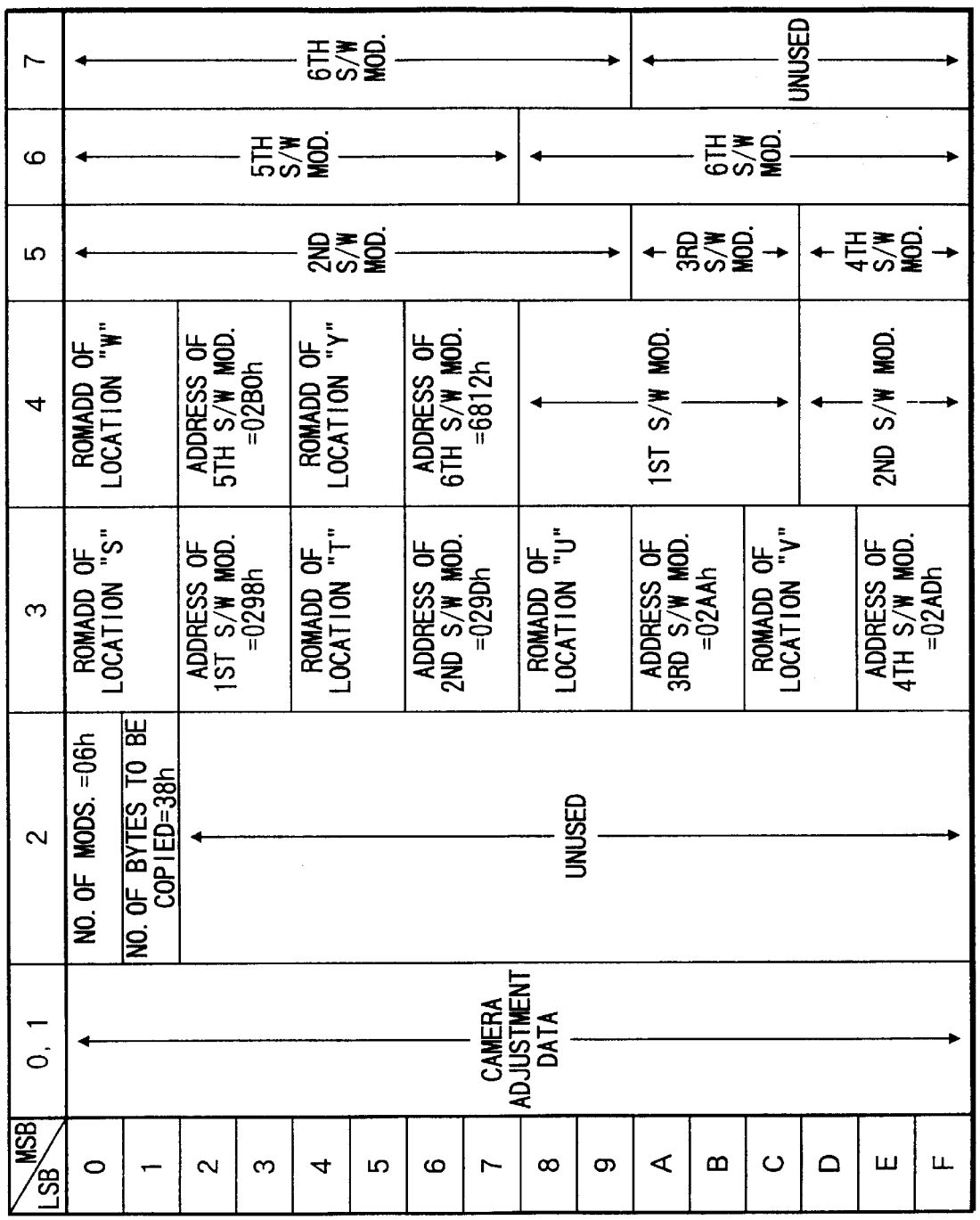
FIG. 3 shows a memory map of an EEPROM used in the electronically controlled camera shown in FIG. 1.

As shown in FIG. 3, camera adjustment data is stored in the address range 00h–1Fh, the number of software modification programs (hereinafter referred to as software modifications) that are to modify the above mentioned process of the main program of the camera (i.e., "06h") is stored at address 20h, while the number of bytes to be copied from the EEPROM 8 to the RAM 7a of the CPU 7 in the reset process (i.e.,"38h") is stored at address 21h. No data is stored in the address range 22h to 2Fh, and 7Ah to 7Fh.

The address range 30h to 47h of the EEPROM 8 stores the information related to the RAM addresses (hereinafter referred to as RAMADD) in the RAM 7a of the CPU 7 where the software modifications of the main program are to be stored after being copied from the EEPROM 8. Further, the address range 30h to 47h of the EEPROM 8 also stores information related to a return address in the ROM (hereinafter referred to as ROMADD) corresponding to various locations in the main program. Furthermore, the address range 48h to 79h of the EEPROM 8 stores the software modifications for each of the processes of the main program that are to be modified.

More specifically, a ROMADD corresponding to a location "S" is stored at addresses 30h and 31h of the EEPROM 8. Then, addresses 32h and 33h store the RAMADD (e.g. 0298h) indicating the starting address in the RAM 7a where the first software modification data is to be stored.

In the preferred embodiment, the first through fifth software modifications are resident data, while the sixth software modification is non-resident data. Resident data is defined as data that is normally stored in the RAM 7a of the CPU 7 during the operation of the camera. As such, the resident data is copied from the EEPROM 8 to the RAM 7a during the initialization routine. However, the non-resident data is copied from the EEPROM 8 to the RAM 7a of the CPU 7 only when the software is to be executed.

When non-resident software is executed, if the non-resident data is written in the RAM 7a in an area where the resident data is stored, the resident data is deleted. However, after the execution of the non-resident software, the non-resident data is deleted and the resident data is again copied from the EEPROM 8 to the RAM 7a.

In a similar manner to that described above, a ROMADD corresponding to a location "T" is stored in 34h and 35h of the EEPROM 8, while the RAMADD "029Dh" in the RAM 7a of the CPU 7 where the second software modification is to be written, is stored in 36h and 37h of the EEPROM 8. Similarly, the a ROMADD corresponding to a location "U" is stored in 38h and 39h of the EEPROM 8, while the RAMADD "02AAh" in the RAM 7a where the third software modification is to be written, is stored in 3Ah and 3Bh of the EEPROM 8.

Further, a ROMADD corresponding to a location "V" is stored in 3Ch and 3Dh of the EEPROM 8, while the RAMADD "02ADh" in the RAM 7a where the fourth software modification is to be written, is stored in 3Eh and 3Fh of the EEPROM 8. Similarly, a ROMADD corresponding to a location "W" is stored in 40h and 41h of the EEPROM 8, while the RAMADD "02B0h" in the RAM 7a where the fifth software modification is to be written, is stored in 42h and 43h of the EEPROM 8.

A ROMADD corresponding to a location "Y" is stored in 44h and 45h of the EEPROM 8, while the copy data "68h" and "12h" of the sixth software modification are stored at 46h and 47h of the EEPROM 8. In this case, the copy data indicates that the sixth software modification has a length of 12h, and is stored starting from the address 68h of the EEPROM 8, (i.e., the sixth software modification is stored from 68h to 79h). Further, the copy data also indicates that the sixth software modification is non-resident data which is to be copied from the EEPROM 8 to the RAM 7a before it is executed.

As shown in FIG. 3, the data for the first software modification is stored at address 48h through 4Ch of the EEPROM 8; the data for the second software modification, at address 4Dh through 59h; the data for the third software modification, at address 5Ah through 5Ch; the data for the fourth software modification, at address 5Dh through 5Fh; the data for the fifth software modification, at address 60h through 67h; and the data for the sixth software modification, at address 68h through 79h.

The method by which the program can be modified will be described below.

During the design of the software that is stored in the ROM 7b of the CPU 7, steps for calling software management routines were added at certain portions of the code. The software management routines are procedures for determining whether a software modification routine is to be executed. If the software modification routine to be executed is non-resident data, then the software management routine copies the non-resident data software modifications into the RAM 7a and the software modification routine is executed. Otherwise, if the software modification routine to be executed is resident data, then the software modification is already stored in the RAM 7a, and therefore the software management routine executes the software modification immediately.

Thus, in order to partially modify an original program, a software modification management routine is called from a desired portion of the original program. Further, the software modification and information thereof (such as information related to a location of the original program where the software modification management routine is to be called— i.e., a ROMADD, address information where the software modification is stored, and information about the copying of the software modification) are written in a data storing element (i.e., EEPROM 8).

The CPU 7 reads software modifications and/or modification information (resident data) from the EEPROM 8 that is necessary for executing the software modification when the camera 1 is reset and started. The read out data is written to the RAM 7a of the CPU 7.

When the software modification management routine is called during the execution of the original program, the ROMADD is stored in a first level of the stack (i.e., stack level 1), as a return address. The return address is then compared with the ROMADD of each of the software modifications stored in the RAM 7a in order to determine which one of the software modifications, if any, is to be executed.

If there is a software modification that has a ROMADD that is the same as the return address, then the software modification is executed. Otherwise, no software modifications are executed, and control returns to the main program.

Further, after the software modification is executed, the return address may be changed, such that software modification management routine returns to a new ROMADD. Therefore, the software modification may designate a new return address, thereby changing the return address of the software modification management.

Furthermore, software which does not need to be performed quickly (i.e., software which can be executed after initialization) are made non-resident data, and are stored in the EEPROM 8.

Hereinafter, the present invention will be described with reference to changing the software of a camera. More specifically, a change in the software for performing a photometry and calculation process will be described, followed by a change in the software for a self-wait process, a change in the software for checking a battery, and a change of a software for mode indication. Further, the controlling operation of the CPU 7 will be described below.

RESET PROCESS

Figure 4:
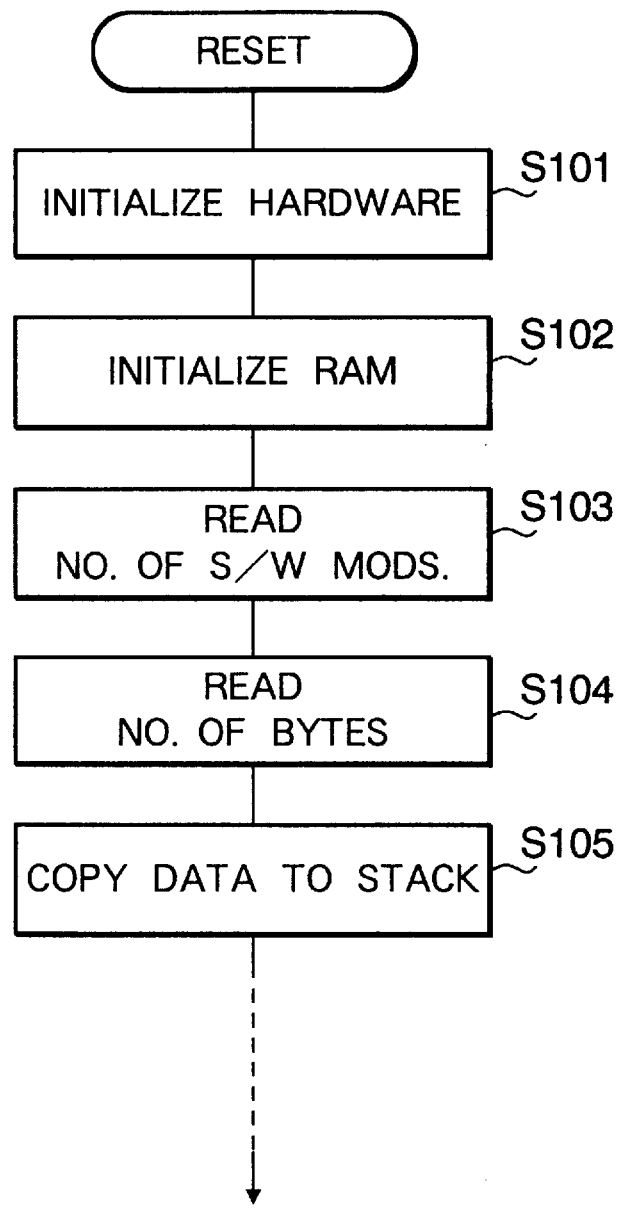
FIG. 4 shows a flowchart of a reset process of the electronically controlled camera shown in FIG. 1.
Figure 5:
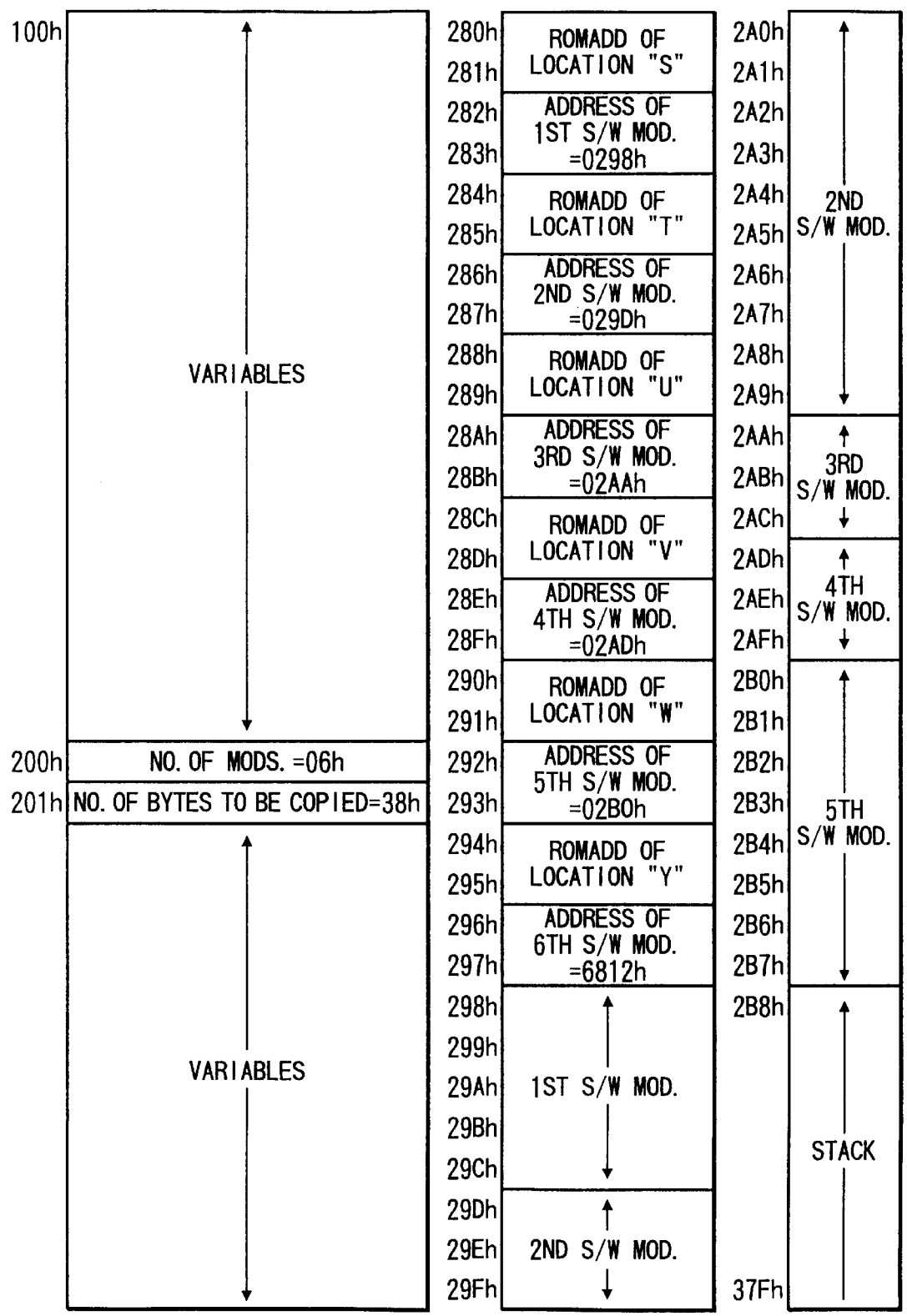
FIG. 5 shows data stored at various addresses in a RAM 7a of the electronically controlled camera shown in FIG. 1.

FIG. 4 shows a flowchart of the reset process. FIG. 5 shows a memory map of a RAM 7a after the reset process has been executed.

The camera 1 starts the reset process when the battery is inserted into the camera.

At step S101, the hardware is initialized. This includes the initialization of the registers and data communication ports. Then in step S102, the RAM 7a is initialized. In step S103, the number of software routines that are to be modified (e.g., 6) is read from the EEPROM 8 and stored in the RAM 7a at address 0200h.

In step S104, the number of bytes of data to be copied from the EEPROM 8 to the RAM 7a (e.g., 38h) is read from the EEPROM 8 and stored at address 201h of the RAM 7a. Then at step S105, the data at address 30h of the EEPROM 8 is copied to the stack area of the RAM 7a. The data being 38h bytes as described above.

With the above process, the modification data (which includes the data addresses where the modified software routines are to be added, the address where the software is stored, and the copy information) of the first through sixth software modifications are stored in the RAM 7a. More specifically, the data stored at address 30h through 67h of the EEPROM 8 is copied to 280h through 2B7h of the RAM 7a.

As shown in FIG. 5, the data related to the insert location of the software modification routines and the data for indicating the address at which the software modification routines are to be written to the RAM 7a, are stored in the RAM 7a when step S105 is executed.

Thus, data corresponding to the first software modification (ROMADD corresponding to location "S", and RAMADD "0298h") is stored at address 280h through 283h of the RAM 7a; data corresponding to the second software modification routine (ROMADD corresponding to location "T", and RAMADD "029Dh") is stored at address 284h through 287h of the RAM 7a; data corresponding to the third software modification routine (ROMADD corresponding to location "U", and RAMADD "02AAh") is stored at address 288h through 28Bh of the RAM 7a; data corresponding to the fourth software modification routine (ROMADD corresponding to location "V", and RAMADD "02ADh") is stored at address 28Ch through 28Fh of the RAM 7a; data corresponding to the fifth software modification routine (ROMADD corresponding to location "W", and RAMADD "02B0h") is stored at address 290h through 293h of the RAM 7a; and data corresponding to the sixth software modification routine (ROMADD corresponding to location "Y", and copy information "6812h") is stored at address 294h through 297h of the RAM 7a.

Further, in step S105, the data corresponding to each of the first five software modification routines is written to the RAM 7a. As such, the data corresponding to the first software modification routine is written to address 298h through 29Ch; the data corresponding to the second software modification routine is written to address 29Dh through 2A9h; the data corresponding to the third software modification routine is written to address 2AAh through 2ACh; the data corresponding to the fourth software modification routine is written to address 2ADh through 2AFh; and the data corresponding to the fifth software modification routine is written to address 2B0h through 2B7h.

The sixth software modification routine is non-resident data and is therefore not copied to the RAM 7a from the EEPROM 8 during the reset process. However, the sixth software modification routine is copied to the stack area of the RAM 7a when it is executed. Further, the sixth software modification routine will be deleted after it has been executed, (i.e., the sixth software modification routine will be overwritten with the resident data).

FIRST AND SECOND SOFTWARE MODIFICATION MANAGEMENT ROUTINES

Figure 6A:
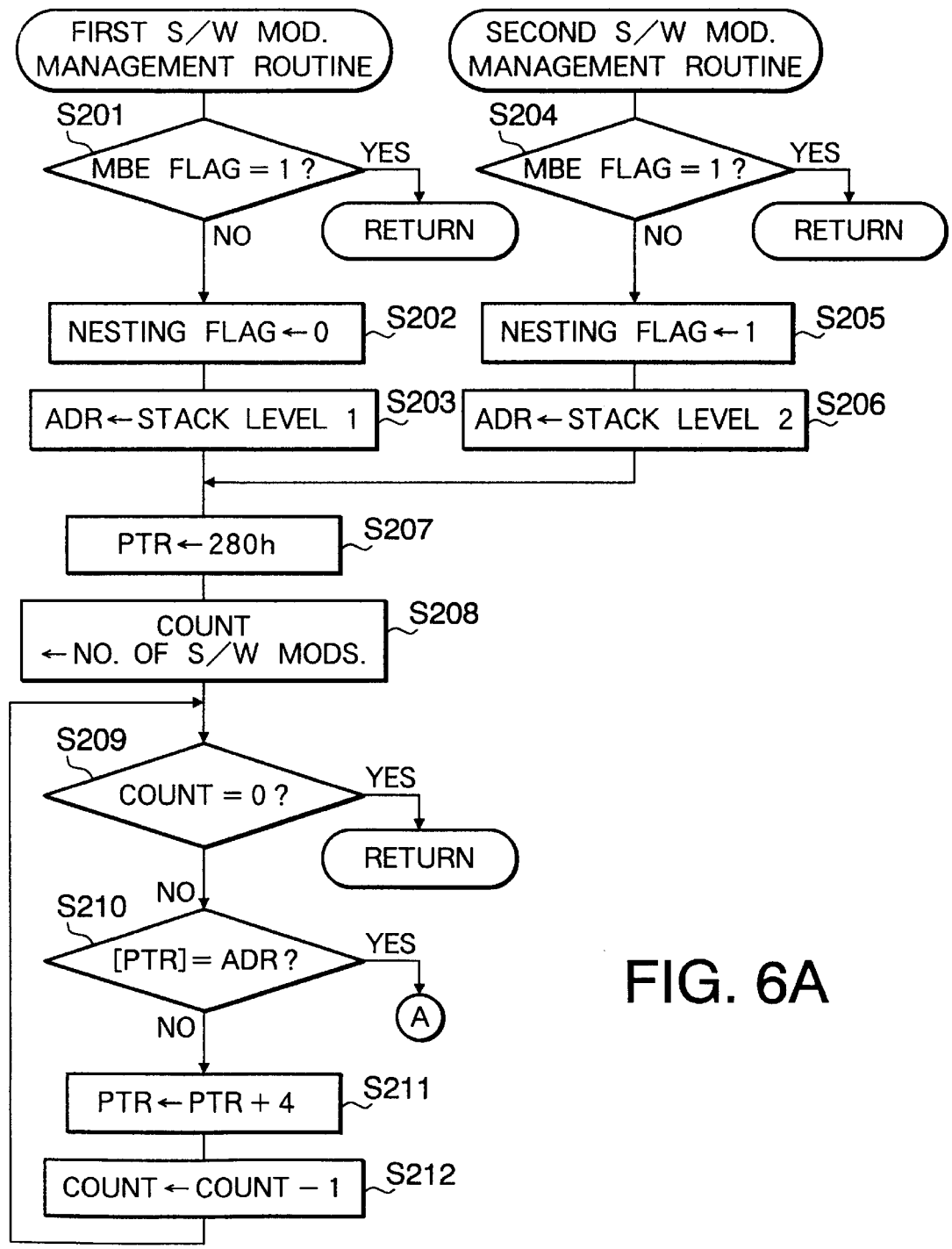
FIGS. 6A and 6B show a flowchart of a first and second software modification management process.
Figure 6B:
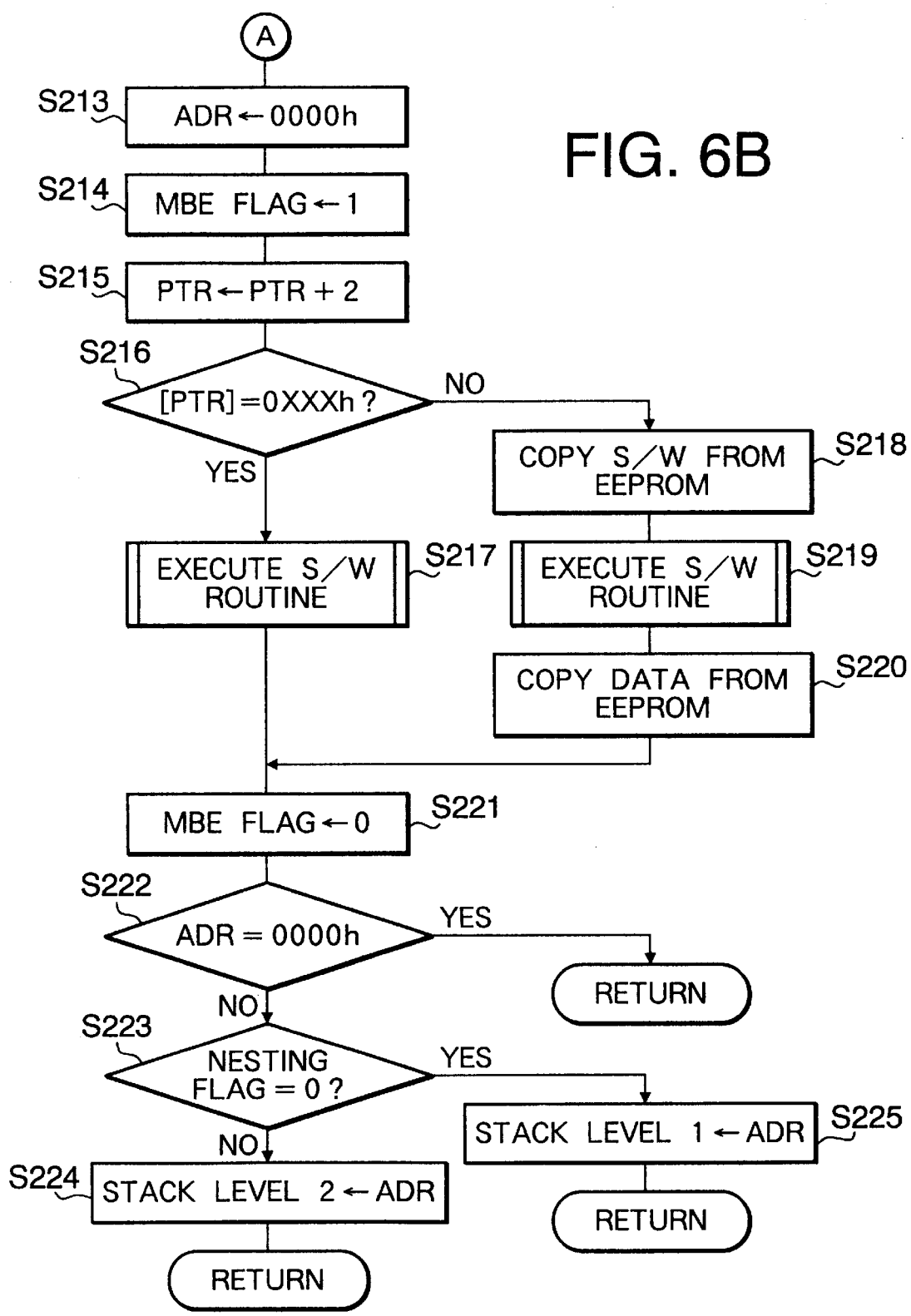

FIGS. 6A and 6B show the first and the second software modification management routines.

Predetermined steps of the software routines are provided for calling a first or second modification management routines. The first and second modification management routines control the modification of the processes of the main program, and are executed whenever they are called.

A modification-being-executed (hereinafter referred to as MBE) flag is set to 1 if either the first or the second software management routine is executed. Further, after the first or second software management routine has finished being executed, the MBE flag is set to 0.

Step S201 determines whether the MBE flag is set to 1. If the MBE flag is set to 1 (S201:YES), then the first or the second software management routine is currently being executed (i.e., the routine is operating recursively). Thus, the routine ends and control returns to a main routine. Otherwise (S201:NO), a nest flag is cleared (i.e., set to 0) in step S202.

Step S203 stores a return address currently in a first level of the stack area (i.e., stack level 1), in a memory ADR. In the preferred embodiment, the stack is a LIFO (last-in-first-out) stack, with the return address stored in the stack level 1 being the last data written in the stack.

Step S204, S205 and S206 are similar to steps S201, S202 and S203, respectively, and are executed when the second modification management program is called. Thus, step S204 determines whether the MBE flag is equal to 1. If the MBE flag is equal to 1 (S204:YES), then the routine ends and control returns to the main program. Otherwise (S204:NO), the nest flag is set equal to 1 in step S205.

Step S206 stores a return address currently in a second level of the stack area (i.e., stack level 2), in the memory ADR. The return address of the stack level 2 corresponds to the return address of a subroutine called by a subroutine of the main program. Thus, in this case, the return address stored in the stack level 2 is the second to last data written into the stack.

Step S207 is then executed after either step S203 or step S206 has been executed.

In step S207, a pointer PTR is set equal to 280h. This is equivalent to the lowest address of the data related to the software modifications that is stored in the RAM 7a.

Step S208 sets a counter COUNT equal to the number of software modifications (e.g., 6). Then step S209 checks whether COUNT is equal to 0.

If COUNT is equal to 0 (S208:YES), then there are no software modifications, or there is no software to be executed that has a location corresponding to the ROMADD of the original software which called the first or second modification management routine. Thus, the routine ends, and control returns to the main program.

If COUNT is not 0 (S209:NO), then step S210 determines whether [PTR] is equal to ADR, where [PTR] is the contents of the two bytes of the RAM 7a starting from the address indicated by PTR of the data copied in the RAM 7a during the reset process. For example, if PTR is set to 280h, then [280h] refers to the ROMADD corresponding to location "S" as shown in FIG. 5.

If [PTR] is not equal to ADR (S210:NO), then PTR is incremented by 4 in step S211, and COUNT is decremented by 1 in step S212, and step S209 is repeated.

However, if [PTR] is equal to ADR (S210:YES), then there is software to be executed. Thus, the value of ADR is set equal to 0000h, in step S213. In step S214, the MBE flag is set equal to 1. The value of PTR is then incremented by 2 in step S215, in order to refer to the stored data position.

Step S216 determines whether [PTR]=0XXXh (i.e., whether the first digit of a four digit address is zero). As stated above, [PTR] refers to the stored data position. If PTR is set to 282h, [282h] refers to "0298h" as shown in FIG. 5. Further, in the above expression X has any value 0h through Fh.

If [PTR]=0XXXh (S216:YES), then the corresponding software is resident data which was copied to the RAM 7a during the reset process. The software is then executed in step S217. For example, if [PTR]=0298h, the software stored in 298h–29Ch of the RAM 7a (i.e., the first software modification) is executed. The subroutine will be described in detail later. Then control proceeds to step S221 where the MBE flag is cleared (i.e., set equal to 0).

However, if [PTR] is not equal to 0XXXh (S216:NO), then the corresponding software is non-resident data which was not copied from the EEPROM 8 to the RAM 7a during the reset process. (Note that if PTR=296h, then for the sixth software modification [PTR]=6812h, and therefore, the sixth software modification is determined to be non-resident data.)

Thus, in step S218, the software is copied from the EEPROM 8 to the RAM 7a.

In step S218, according to the value of [PTR], the sixth software modification stored in the address range 68h through 79h (i.e., 12h in length) of the EEPROM 8 is read, and is stored in the RAM 7a at the address 280h through 291h. In other words, in the preferred embodiment, the address 280h is the starting address in the RAM 7a for receiving the non-resident data from the EEPROM 8.

Then in step S219, the sixth software modification stored in the address range 280h through 291h of the RAM 7a is executed. The sixth software modification will be described in detail below.

In step S220, the resident data (data for the first through fifth software modifications) is copied from EEPROM 8 to the RAM 7a. As further shown in FIG. 5, the resident data is read out of the EEPROM 8 and stored in the address range 280h through 2B7h of the RAM 7a. With this operation, the sixth software routine is deleted. Then control proceeds to step S221 where the MBE flag is cleared (i.e., set equal to 0).

Step S222 determines whether ADR is equal to 0000h. If either the fifth or sixth software modification is executed, a predetermined address is stored in ADR and therefore ADR is not equal to 0000h. If ADR is equal to 0000h (S222:YES), then the routine ends and control returns to the main routine.

If ADR is not equal to 0000h (S222:NO), then step S223 determines whether the nesting flag is equal to 0. If the nesting flag is not equal to 0 (S223:NO), then step S224 sets the return location of the stack level 2 to be equal to ADR. Otherwise (S223:YES), step S225 sets the return location of the stack level 1 to be equal to ADR. In this case the return address presently stored in the stack is over written with the new return address.

The routine then ends, and control returns to the main program.

In the preferred embodiment of the camera 1, six modifications of different software procedures will be implemented.

MODIFICATION OF PHOTOMETRY PROCESS

FIG. 7 shows a table of modes of operation of the camera 1. The camera 1 has four modes of operation: an automatic mode, a strobe-off mode, a strobe-on mode, and an exposure compensation mode.

In the automatic mode, the strobe is turned ON if the photometric calculation performed by the CPU 7 determines that the exposure value Ev is less than 10. If the exposure value is greater than or equal to 10, then the strobe is not turned ON. Further, the lower speed limit is set to Ev greater than or equal to 10. The LCD display of the camera displays the symbol Ml, shown in FIG. 21.

In the strobe-off mode, the strobe is never turned ON, even when the exposure value is low. In this case, the lower speed limit is set greater than or equal to 6, and the LCD display of the camera displays the symbols M2 and M3, shown in FIG. 21.

In the strobe-on mode, the strobe is always discharged whenever an exposure is made. In this case, the lower speed limit is set greater than or equal to 10, and the LCD display of the camera displays the symbol M3, shown in FIG. 21.

In the exposure compensation mode, the strobe is always turned OFF. In this case, the lower speed limit is set greater than or equal to 6, and the LCD display of the camera displays the symbol M4, shown in FIG. 21.

Figure 8A:
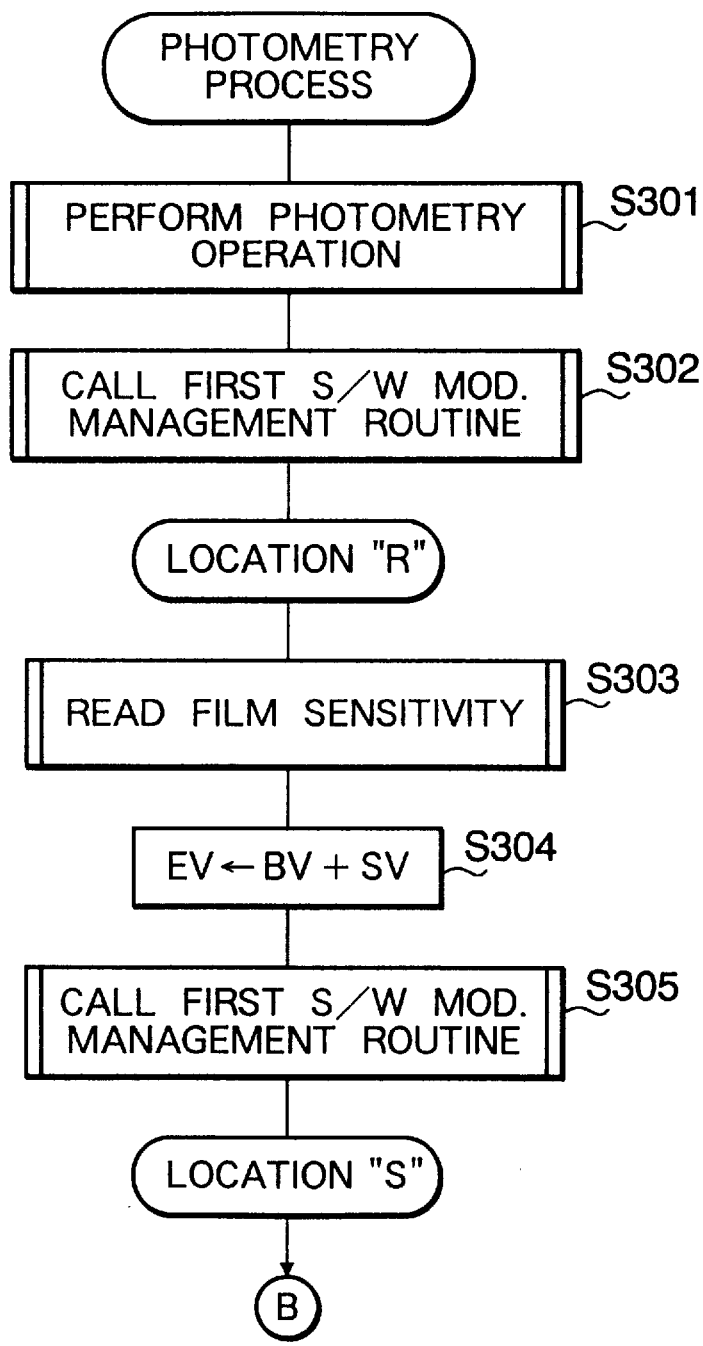
FIGS. 8A and 8B show a flowchart of a photometry process performed by the electronically controlled camera shown in FIG. 1.
Figure 8B:
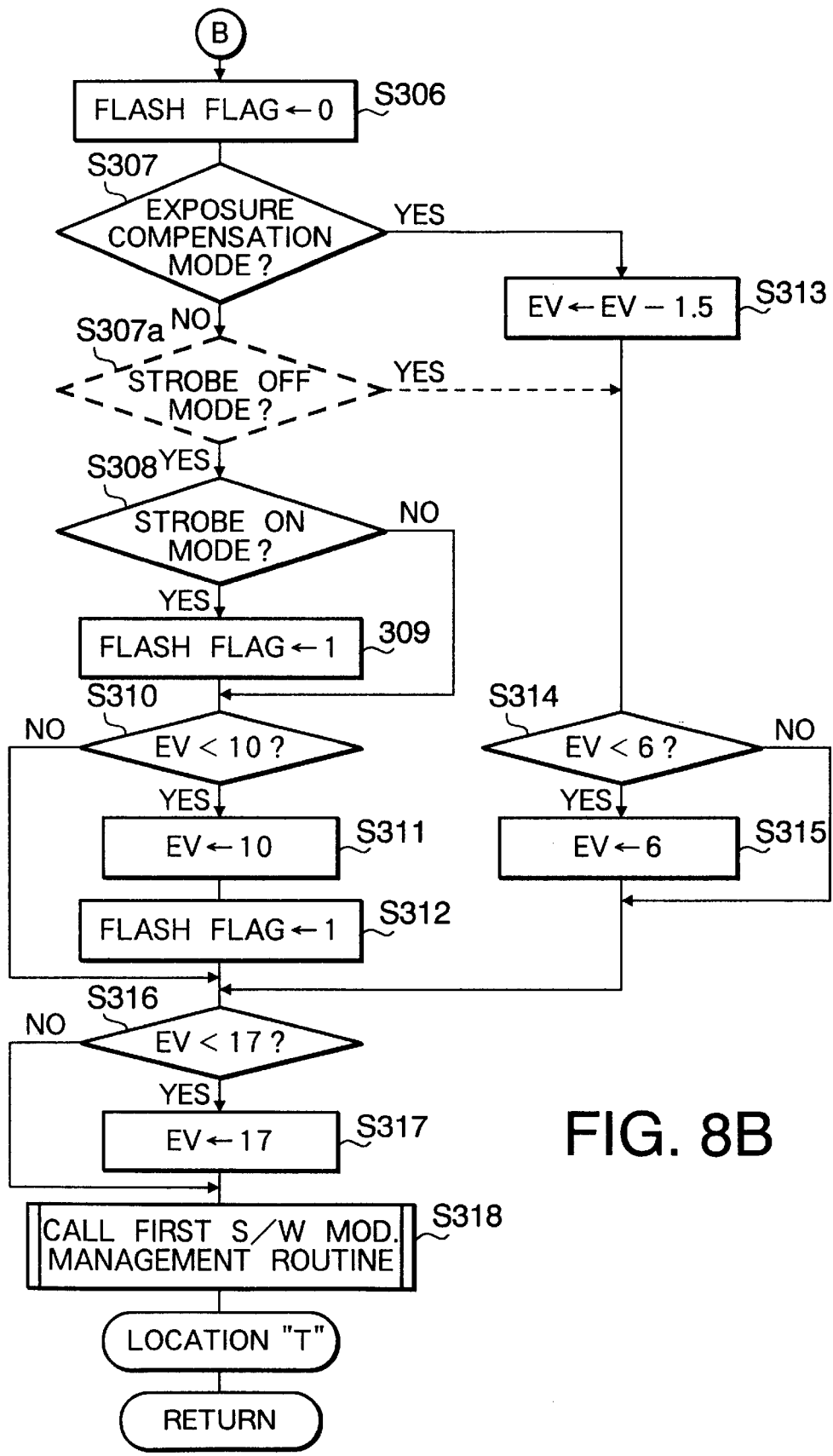

FIGS. 8A and 8B show an example of a flowchart of the photometry process which has a software defect. In this example, an operation for determining whether the strobe-off mode was set (shown by step S307a in FIG. 8B), is missing from the program between steps S307 and S308. As a result, the photometry calculation routine does not operate properly, as described below.

In step S301, a light measurement operation is performed, using the photometric circuit 2. Then in step S302, the first software management routine is called. At step S302A, the first software management routine checks Location "R" for an address of a software modification to be made. Since there are no software modifications to be performed in the original program, control proceeds to step S303.

In step S303, the CPU 7 retrieves the film sensitivity information from the film sensitivity detector 14, and performs the exposure calculation to obtain the exposure value EV, in step S304. The exposure value EV is given by the equation Ev=Bv+Sv.

In step S305, the first modification process is called again. At step S305A, the first software management routine checks Location "S" for an address of a software modification to be made. However, as there are no software modifications to be performed in the original program, control proceeds to step S306, which clears the flashing flag (i.e., sets the flashing flag equal to 0). If the flashing flag is equal to 0, then the strobe does not flash. Conversely, if the flashing flag is set equal to 1, the strobe control circuit 6 controls the strobe 6 to flash.

Step S307 determines whether the exposure compensation mode has been set. If the exposure compensation mode has been set (S307:YES), then step S313 decrements the Ev value by 1.5 Ev. Step S314 determines whether the Ev value is less than 6. If the Ev value is less than 6 (S314:YES), then the Ev value is set equal to 6, in step S315. Then control proceeds to step S316. If the Ev value is not less than 6 (S314:NO), then step S315 is not executed.

If the exposure compensation mode is not set (S307:NO), then step S308 determines whether the strobe-on mode is set. If the strobe-on mode is set (S308:YES), then the flashing flag is set equal to 1 in step S309. Then, step S310 is executed. If the strobe-on mode is not set (S308:NO), then step S309 is not executed, and control proceeds to step S310.

Step S310 determines whether the exposure value Ev is less than 10. If the exposure value Ev is less than 10 (S310:YES), then step S311 sets the exposure value equal to 10 in step S311, and sets the flashing flag equal to 1 in step S312. Then step S316 is executed. However, if the exposure value is not less than 10 (S310:NO), then steps S311 and S312 are not executed.

Step S316 determines whether the exposure value Ev is less than 17. If the exposure value is less than 17 (S316:YES), then the exposure value is set equal to 17 in step S317. Then step S318 is executed. Otherwise (S316:NO), step S317 is not executed.

Step S318 calls the first software management routine. At step S318A, the first software management routine checks Location "T" for an address of a software modification to be made. However, since there are no software modifications in the original program, the routine ends, and control returns to the main program.

Thus, in accordance with the photometry routine described above, and shown in FIGS. 8A and 8B, if the strobe-off mode is set, and the exposure value is less than 10, the exposure value will be set equal to 10 in step S311. However, if the software included the step for detecting the strobe-off mode (shown by step S307a in FIG. 8B), then for exposure values greater than or equal to 6, the exposure value would remain unmodified, but for exposure values less than 6, the exposure value would be set equal to 6 in step S315.

Therefore, according to the unmodified software routine, certain exposure values will be erroneously compensated in the strobe-off mode, resulting in an improperly exposed photograph.

Thus, according to the present invention, two software modifications will be implemented that will result in the photometry process operating as if step 307a for detecting whether the strobe-off mode is set, was invoked.

Figure 9:
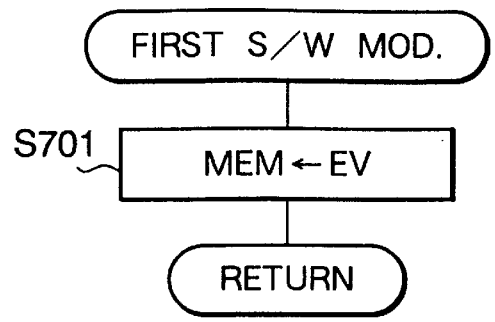
FIG. 9 shows a flowchart of a first software modification.

FIG. 9 shows a flowchart of the first software modification routine.

In the current program, when the strobe-off mode is selected, the lower speed limit is set equal to 10.

In the first software modification the exposure value Ev is stored in a memory MEM in step S701. Further, as shown in FIG. 3, the routine returns to the ROMADD corresponding to location "S" after invoking the first software modification.

Figure 10:
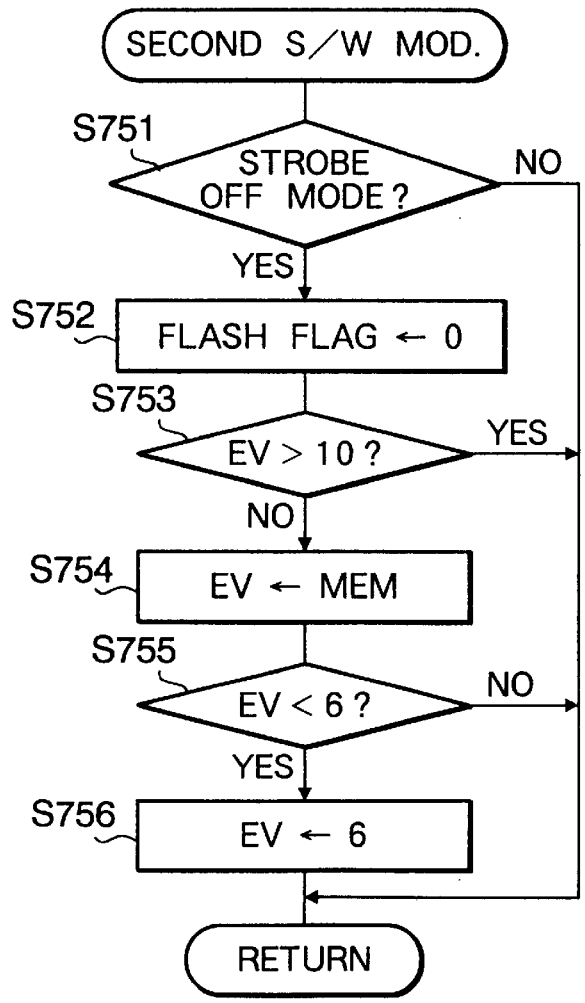
FIG. 10 shows a flowchart of a second software modification.

FIG. 10 shows a flowchart of the second software modification routine. The second software modification adds the step of determining whether the operation mode is the strobe-off mode, and then sets the exposure value accordingly, as explained below.

Step S751 determines whether the operation mode is the strobe-off mode. If the mode of operation is not the strobe-off mode (S751:NO), then the routine ends and control returns to the photometry routine. If the mode of operation is the strobe-off mode (S751:YES), then the flashing flag is cleared in step S752.

Step S753 determines whether the exposure value Ev is greater than 10. If the exposure value is not greater than 10 (S753:NO), then the exposure value is replaced with the value of MEM in step S754. Otherwise (S753:YES), the routine ends.

Step S755 determines whether the exposure value is less than 6. If the exposure value is less than 6 (S755:YES), then the exposure value is set equal to 6 and the routine ends. Otherwise (S755:NO), step S756 is not executed.

The operation of the photometry routine shown in FIGS. 8A and 8b, in which the first and second software modifications are activated, will be explained below.

At step S302, the first software modification management routine is called. In this case the return address stored in the stack level 1 is the ROMADD which corresponds to the location "R". However, none of the ROMADDs stored in the RAM 7a (i.e., at addresses 280h–281h, 284h–285h, etc.) correspond to the location "OR". Therefore, steps S209 through S212 are repeatedly executed until COUNT is equal to 0, where the first software modification management routine ends. As a result none of the six software modifications are executed.

After steps S303 and S304 are executed, step S305 calls the first software modification management routine. In this case, the return address stored in stack level 1 is the ROMADD corresponding to the location "S". However, the first software modification routine shown in FIG. 9, has a ROMADD corresponding to location "S". Therefore, the first software modification routine is executed, and the current exposure value is stored in the variable MEM.

Steps S306 through S317 are then executed as described above. Step S318 calls the second software management routine. In this case, the return address stored in the stack level 2 is the ROMADD corresponding to the location "T". However, the second software modification routine shown in FIG. 10, has a ROMADD corresponding to location "T", and therefore, the second software modification routine is executed.

Thus, by executing the second software modification, at step S318, it is possible to modify the functionality of the photometry process to include the determination of whether the operating mode is the strobe-off mode.

MODIFICATION OF SELF TIMER LAMP OPERATING PROCESS

Figure 11A:
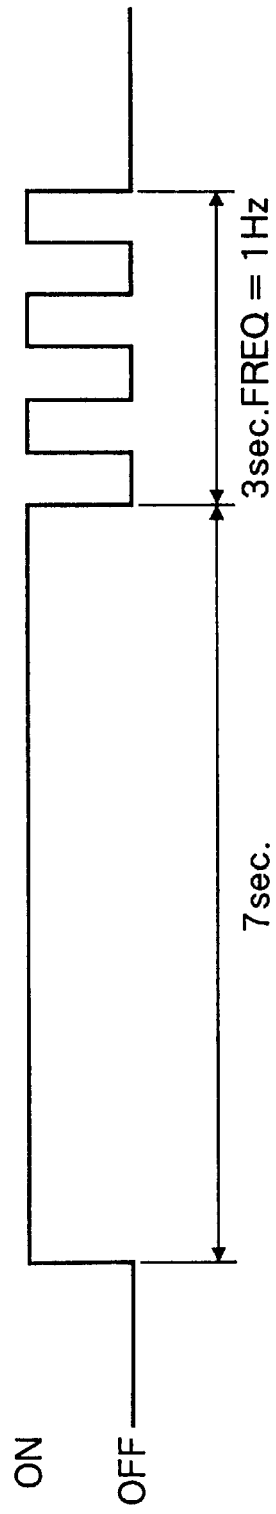
FIG. 11A shows a timing diagram of a self-timer operation of the electronically controlled camera shown in FIG. 1 before the software is modified.
Figure 11B:
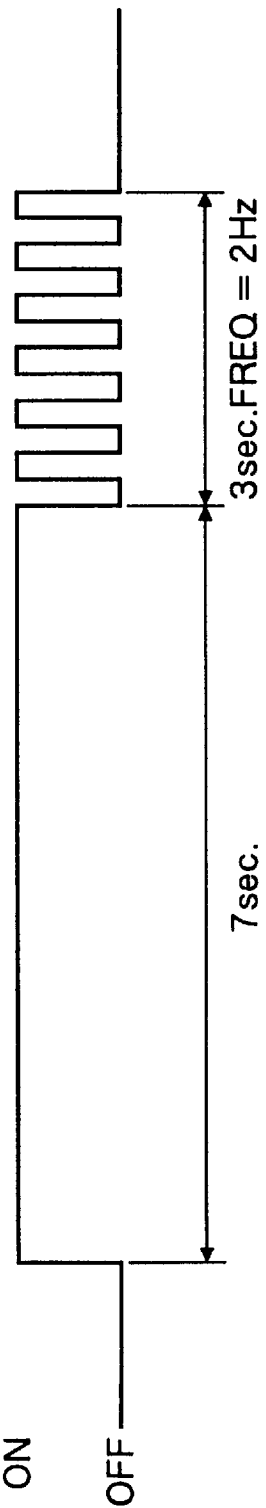
FIG. 11B shows a timing diagram of the self-timer operation of the electronically controlled camera shown in FIG. 1 after the software is modified.

FIGS. 11A and 11B show timing diagrams of an operation of a self timer lamp controlled by an original self timer lamp operating routine and a modified self timer lamp operating routine, respectively. As shown in FIG. 11A, in the self timer mode, after the release button has been pressed, the original self timer lamp operating routine controls the self timer lamp to be continuously lit for 7 seconds, and then to blink for 3 seconds with a frequency of 1 Hz. After the self timer lamp operating routine has been modified, the self timer lamp will blink for 3 seconds at a frequency of 2 Hz, as shown in FIG. 11B.

The operation of the original (unmodified) self timer lamp operating routine will be described with reference to FIG. 12.

In step S401, an interrupt flag is cleared (i.e., set equal to 0). When the interrupt flag is set equal to 0 only the self timer lamp operating process and the exposure operation can occur. If the interrupt flag is equal to 1, then other interrupt operations can be performed, and the exposure operation is not executed.

Figure 13:
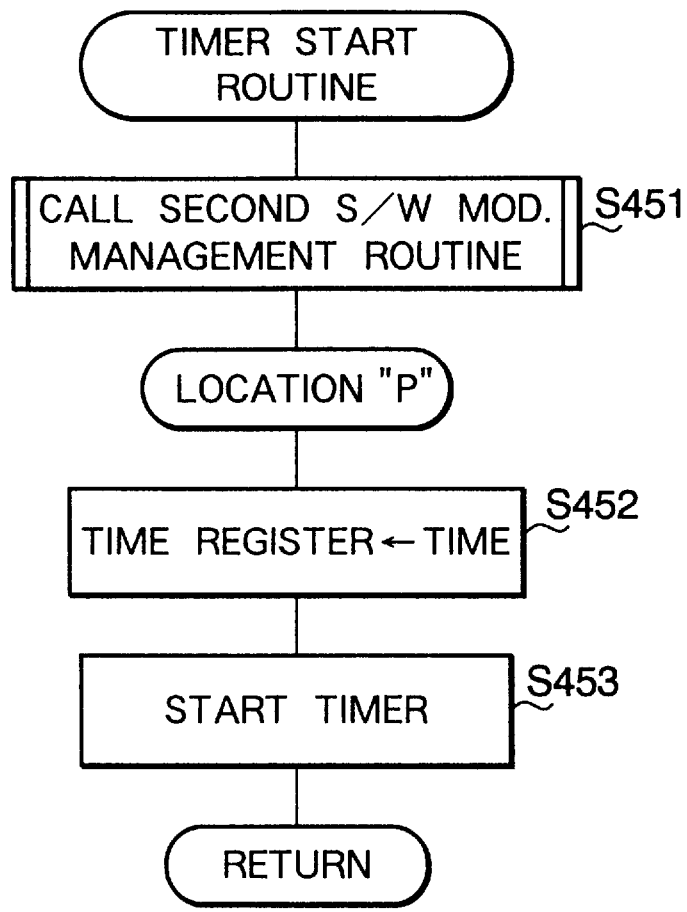
FIG. 13 shows a flowchart of a self timer start routine called by the self-timer process routine shown in FIG. 12.

In step S402, the self timer lamp is lit, while a lighting flag is set equal to 1 in step S403. Further, the variable count is set equal to 7 (i.e., indicating 7seconds) in step S404. Then in step S405, a variable TIME is set equal to 7000 ms. A timer start routine, shown in FIG. 13, is executed in step S406. The timer start routine, at step S406A, checks Location "U" for an address of a software modification to be made.

The timer start routine calls the second software modification routine in step S451. At step S451A, the second software management routine checks Location "P" for an address of a software modification to be made. However, since there are no software modifications in the original program, then control proceeds to step S452, where the value of TIME is stored in a timer register. The timer is then started in step S453, and the timer start routine ends. Control then returns to step 407 of the self timer lamp operating routine.

Step S407 detects whether a main switch is ON. If the main switch is ON (S407:YES), then the interrupting flag is set equal to 1 in step S408, and control returns to the main program., and the self-timer process is ended.

However, if the main switch is OFF (S407:NO), then step S409 determines whether the time is up (i.e., the interval corresponding to TIME has elapsed).

If the time is not up (S409:NO), then step S407 is repeated. Otherwise (S409:YES), COUNT is decremented by 1 in step S410. Step S411 determines whether COUNT is equal to 0. When COUNT is equal to 0 (S411:YES), step S419 turns the self timer lamp OFF, and control returns to the main program.

If COUNT is not equal to 0 (S411:NO), then step S412 determines whether the lighting flag is equal to 1. If the lighting flag is equal to 1 (S412:YES), then the self timer lamp is turned OFF in step S413, and the lighting flag is set equal to 0 in step S414.

However, if the lighting flag is equal to 0 (S412:NO), then the self timer lamp is turned ON in step S415, and the lighting flag is set equal to 1 in step S416.

In step S417, the variable TIME is set with a value of 500 ms, in order to blink the self timer lamp at 1 Hz. Then, in step S418, the start timer routine, shown in FIG. 13, and described above, is executed based on an address of a software modification to be made located in Location "V", as shown at step S418A. Control then returns to step S407.

Thus, as described above, the self timer lamp is continuously lit for 7 seconds, and then blinked with a frequency of 1 Hz and a duty cycle of 50%.

However, if the frequency of blinking the self timer lamp is to be changed from 1 Hz to 2 Hz, then the software must be modified.

Figure 14:
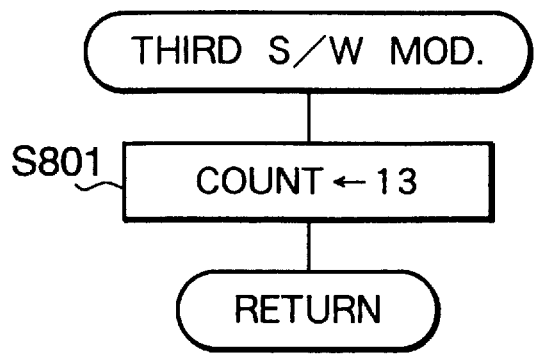
FIG. 14 shows a flowchart of a third software modification.
Figure 15:
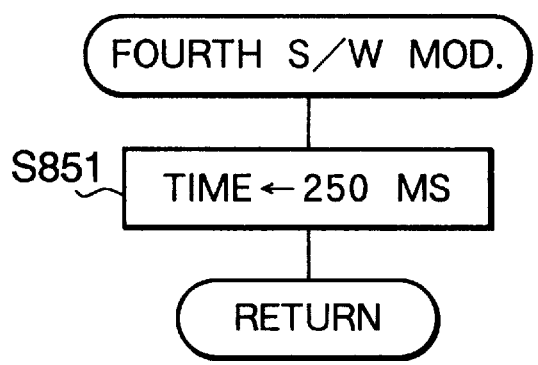
FIG. 15 shows a flowchart of a fourth software modification.

FIGS. 14 and 15 show a third software modification routine and a fourth software modification routine, respectively, which are used to modify the operation of the self timer lamp operation routine. When the third software modification is activated, the value of COUNT is set equal to 13, in step S801. Similarly, when the fourth software modification is activated, the value of TIME is set equal to 250 ms, in step S851.

The operation of the modified self timer lamp operation routine will be described below.

Steps S401 through S405 are the same as described for the unmodified self timer lamp operation routine described above. Then in step S406, the timer start routine is called. The return address of the timer start operation is the ROMADD corresponding to the location "U", which is stored in the stack level 1.

In step S451 of the timer start routine, the second software modification management routine is called. The return address of the second software management routine is the ROMADD corresponding to the location "P", which is now stored in the stack level 1. The ROMADD corresponding to the location "U" is then stored in the stack level 2.

Since the second software modification routine is called, the nesting flag is set equal to 1 in step S205. Then in step S206, the next to last ROMADD stored in the stack, which is the ROMADD corresponding to the location "U" (i.e., [288h]) is stored in the ADR. Then, step S210 determines that [PTR] (which is equal to [288h]), is equal to ADR, and control proceeds to step S213. Step S216 then determines that [PTR] is equal to 0XXXh, and the third software modification routine is executed in step S217.

FIG. 14 is a flowchart illustrating the third software modification routine.

In step S801, COUNT is set equal to 13 (i.e., changed from 7 to 13). Then the routine ends and control returns to step S217.

After step S221 and the following steps are executed, control returns to the ROMADD corresponding to the location "P", which is after step S451.

Then step S452 sets the timer register to be equal to the variable TIME (i.e., equal to 7000 ms). The timer is then started in step S453, and control returns to the ROMADD corresponding to the location "U", which is after step S406.

Steps S407 through S417 are the same as described above. Then in step S418, the timer start routine is called. The return address of the timer start operation is the ROMADD corresponding to the location "V", which is stored in the stack level 1.

In step S451 of the timer start routine, the second software modification management routine is called. The return address of the second software management routine is the ROMADD corresponding to the location "P", which is now stored in the stack level 1. Then the ROMADD corresponding to the location "V" is stored in the stack level 2.

Since the second software modification routine is called, the nesting flag is set equal to 1 in step S205. Then in step S206, the next to last ROMADD stored in the stack, which is the ROMADD corresponding to the location "V"(i.e., [28Ch]) is stored in the ADR. Then step S210 determines that [PTR] (which is equal to [28Ch]), is equal to ADR, and control proceeds to step S213. Step S216 then determines that [PTR] is equal to 0XXXh, and the fourth software modification routine is executed in step S217.

FIG. 15 is a flowchart showing the fourth software modification.

In the fourth software modification, the frequency of blinking the self timer lamp is set to 2 Hz. Therefore, in step S851, 250 ms is stored in the variable TIME. This results in the self timer lamp being turned ON for 250 ms and then turned OFF for 250 ms. Control then returns to step S217.

After the second software management routine is finished in step S451, control returns to the ROMADD corresponding to the location "P". Then in step S452, 250 ms is stored in the timer register.

Figure 12:
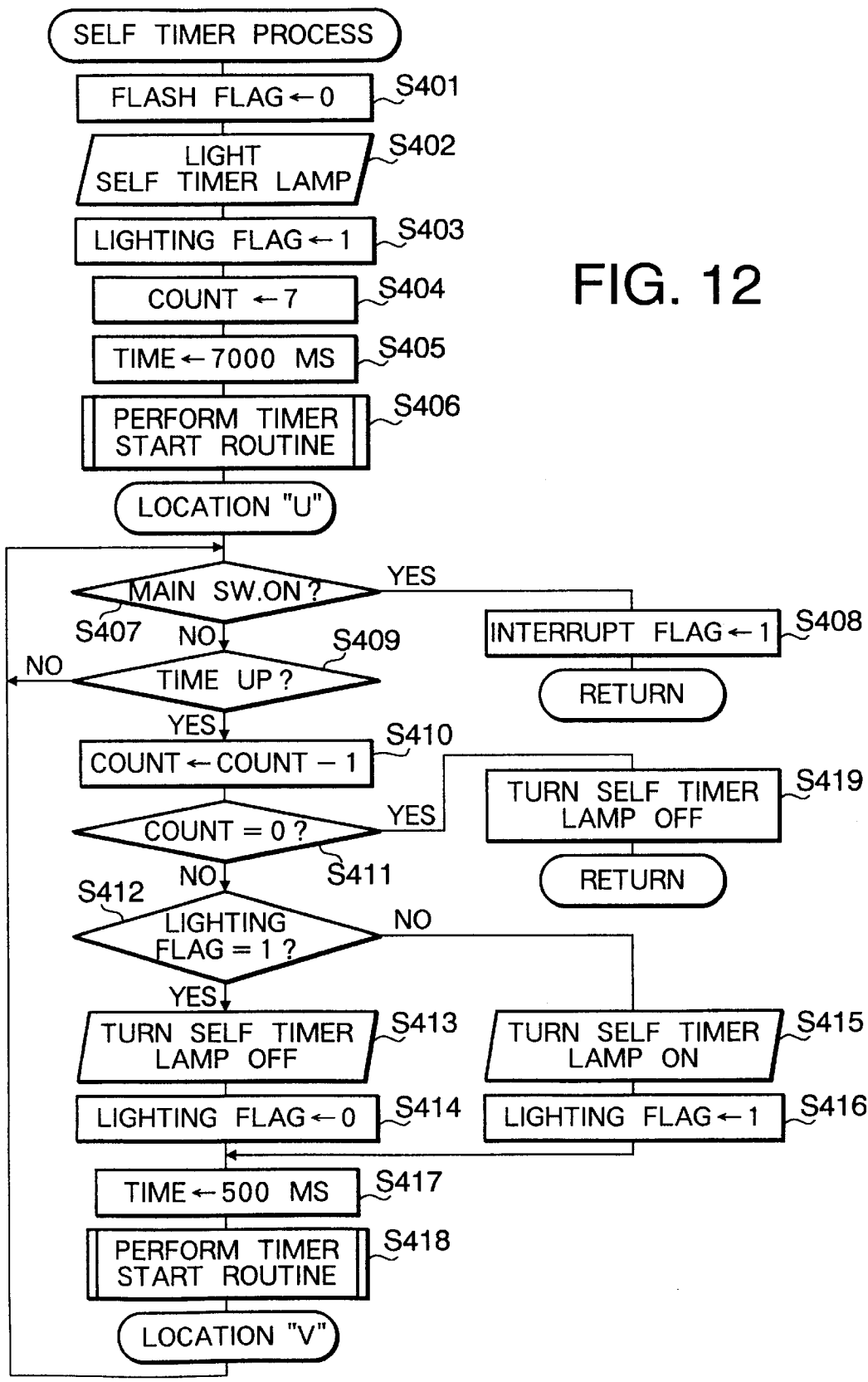
FIG. 12 shows a flowchart of a self-timer process of the electronically controlled camera shown in FIG. 1.

At step S453, the timer is started, and then control returns to the ROMADD corresponding to the location "V" which is after step S418 of the self timer process shown in FIG. 12.

As described above, if the first software management routine is not called during the execution of the software to be modified, but the second software management routine is called, and the general subroutine is called in the software to be modified, the modification can be made.

In the above described example, the timer start process is called twice. The first time the timer start routine is called, the third software modification routine which changes the number of times the self timer lamp is to be blinked, is executed. The second time the timer start routine is called, the fourth software modification routine which changes the frequency of the blinking of the self timer lamp, is executed. As a result of the changes, the operation of the self timer lamp can be changed.

MODIFICATION OF THE BATTERY CHECK PROCESS

In the original unmodified program, the battery is checked 5 ms after a load is connected to the battery. However, in this example, the program is to be modified such that the battery check is executed 10 ms after the load is connected to the battery.

Figure 16:
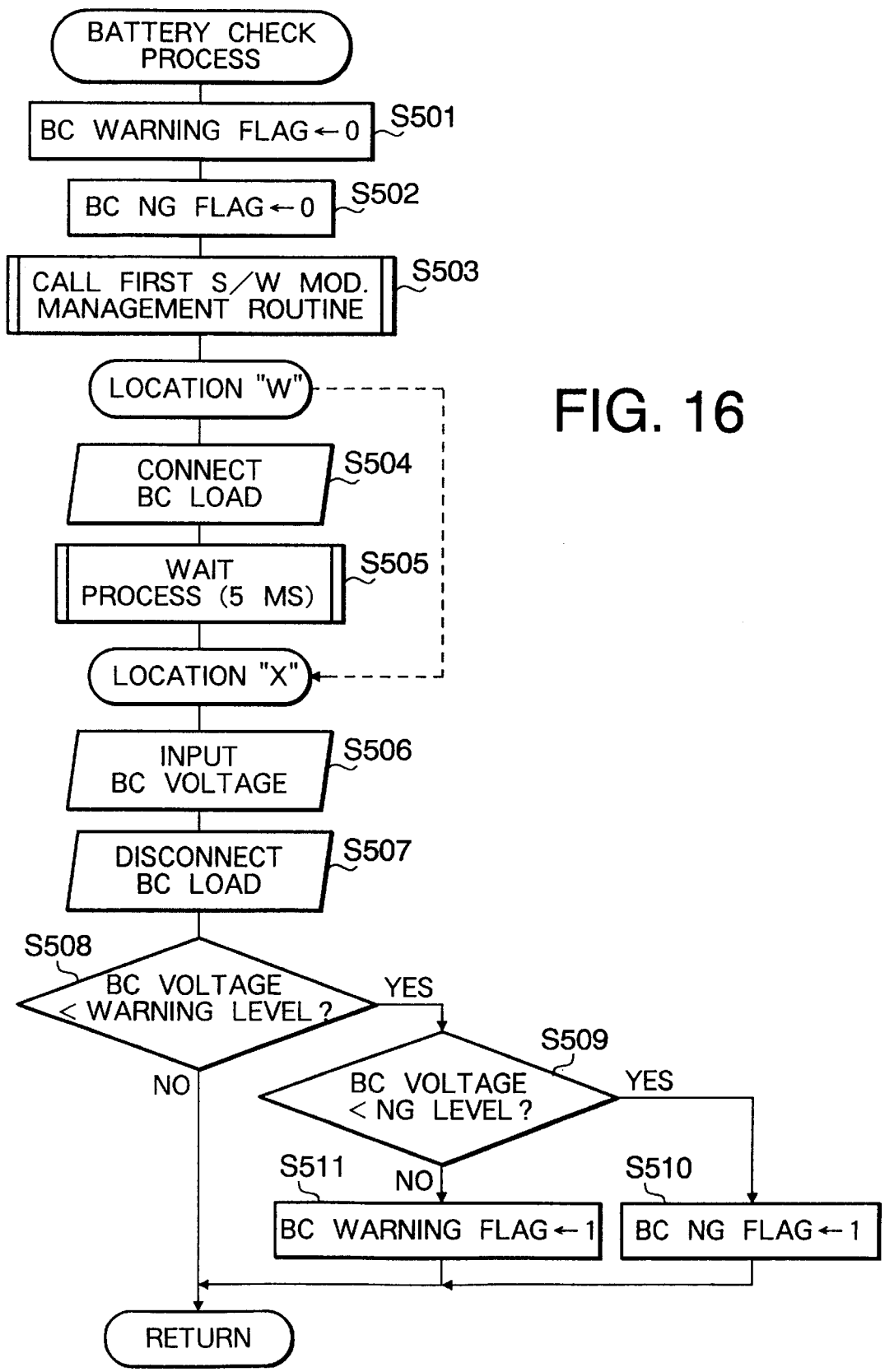
FIG. 16 shows a flowchart of a battery check process of the electronically controlled camera shown in FIG. 1.

FIG. 16 shows a flowchart of the battery check process. The operation of the original (unmodified) battery check process will be described with reference to FIG. 16.

In step S501, a BC (battery check) warning flag is set equal to 0. The BC warning flag is set equal to 1 after the battery check process has been performed. The BC warning indication is displayed on the external LCD 27.

In step S502, the BC NG (battery check no good) flag is cleared (i.e., set equal to 0). If the BC NG flag is set equal to 1 (in step S510 discussed below), then BC NG is displayed on the external LCD 27 after the battery check process is performed.

In step S503, the first software modification management process is called. At step S503A, the first software management routine checks Location "W" for an address of a software modification to be made. However, since there are no software modifications in the original program, control proceeds to step S504, where the load used to detect the battery is connected. Then at step S505, a wait process is called, which delays the sensing of the battery voltage for 5 ms after the load has been connected across the battery. At step S505A, the wait process checks Location "X" for an address of a software modification to be made.

Then at step S506, the battery voltage is input. The analog voltage is converted to a digital value which is input to the CPU 7. The load is then disconnected from the battery in step S507. Step S508 determines whether the input battery voltage (i.e., the BC voltage) is less than a warning level. If the BC voltage is not less than the warning level (S508:NO), then the routine ends. Otherwise (S508:YES), step S509 determines whether the BC voltage is less than a NG (no good) level, which is lower than the warning level. If the BC voltage is not less than the NG level, then the BC warning flag is set equal to 1 in step S511, and the routine ends. Otherwise (S509:YES), the BC NG flag is set equal to 1, in step S510, and the routine ends.

However, if the time delay between the connecting of the load across the battery, and the detection of the battery voltage is to be changed, then the software must be modified.

Figure 17:
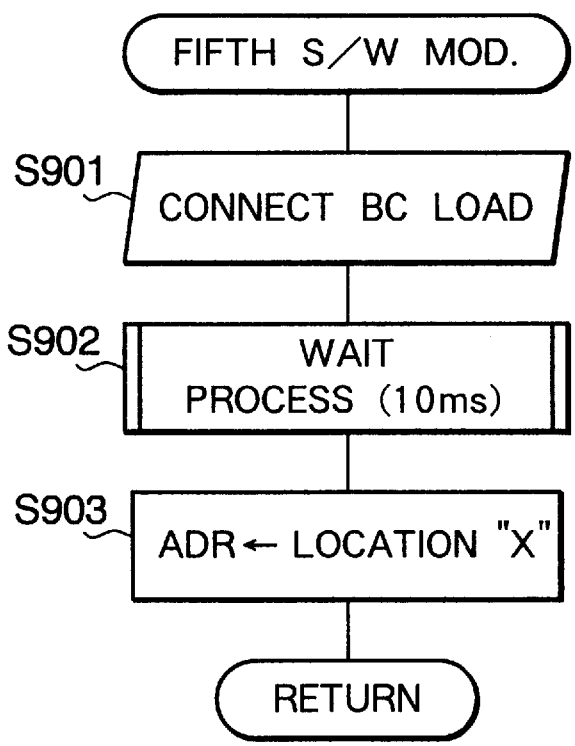
FIG. 17 shows a flowchart of a fifth software modification.

FIG. 17 shows the flowchart of the fifth software modification routine.

In step S901 the BC load is connected across the battery. Then in step S902, the wait process is called. In this case the wait process delays the sensing of the voltage across the battery for 10 ms. Then in step S903, the ADR is set to equal to store the ROMADD corresponding to the location "X", and the routine ends.

The operation of the modified battery check process will be described below.

Steps 501 and 502 are the same as described for the unmodified battery check process. Then in step S503, the first software modification management routine is called.

In this case, the return address of the stack level 1 is the ROMADD corresponding to the location "W", which is the same as the ROMADDD of the fifth software modification routine.

As such, [PTR] is set equal to [290h] in step S207 of the first software management routine, and further [PTR] is equal to ADR. Therefore, in step S215, [PTR] is incremented by 2 to become [292h], and then in step S217, the fifth software modification routine is executed.

After the fifth software modification has been executed, the ROMADD corresponding to the location "W" stored in the stack is replaced with the address stored in ADR (i.e., the ROMADD corresponding to the location "X") in step S225. Then after the first software modification management routine has ended, control returns to the ROMADD corresponding to the location "X" which is after step S505. Thus, since the return address is changed from the ROMADD corresponding to the location "W" to the ROMADD corresponding to the location "X", steps S504 and S505 are not executed.

As described above, during the execution of the fifth software modification routine, the memory ADR is rewritten. Thus the return address of the first modification management process is changed and two steps (i.e., steps S504 and S505) are not executed. Therefore, using the above control, the steps of the original program that are located between the two different return addresses can be deleted (or skipped) as desired.

MODIFICATION OF MODE INDICATION PROCESS

Figure 18:
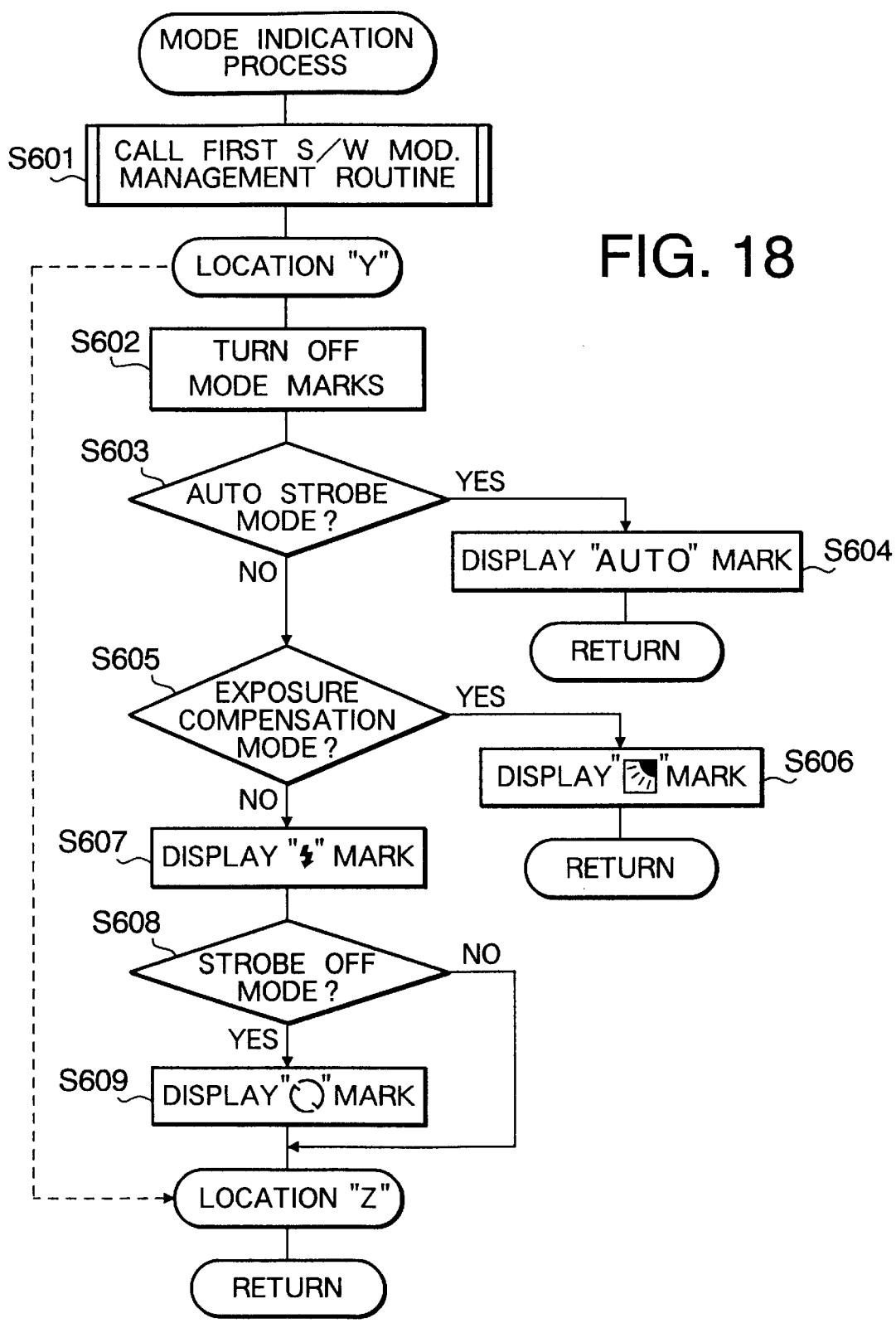
FIG. 18 shows a flowchart of a mode indication process.

The operation of the original (unmodified) mode indication process will be described with reference to FIG. 18.

In step S601, the first modification management process is called. At step S601A, the first software management routine checks Location "Y" for an address of a software modification to be made. However, since there are no software modifications in the original program, control proceeds to step S602.

Figure 21:
FIG. 21 shows four different marks that can be displayed on an indication unit of the electronically controlled camera shown in FIG. 1.
Figure 21:
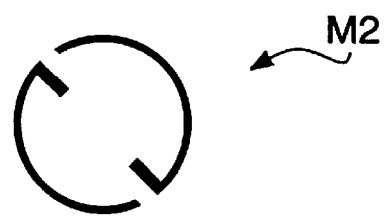
Figure 21:
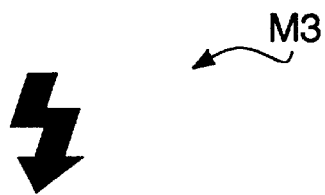
Figure 21:
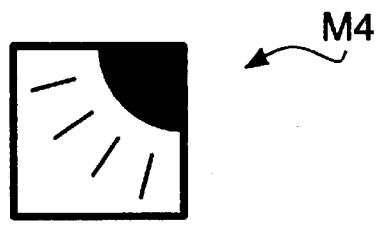

Step S602 turns OFF all the mode marks that can be displayed on the external LCD 27. These mode marks are shown in FIG. 21, and include M1, M2, M3 and M4.

Step S603 determines whether the automatic strobe mode is selected. If the automatic strobe mode is selected (S603:YES), then mark M1 (i.e., "auto") is displayed in the external LCD 27, in step S604, and the routine ends.

Otherwise (S603:NO), step S605 determines whether the exposure compensation mode is turned ON. If the exposure compensation mode is turned ON (S605:YES), then mark M4 is displayed in the external LCD 27, in step S606, and the routine ends.

If the exposure compensation mode is not set (S605:NO), then mark M3 is displayed in the external LCD 27, in step S627. Then step S608 determines whether the strobe-off mode is set. If the strobe off mode is set (S608:YES), then mark M2 is displayed in the external display 27, in step S609, and the routine ends as, at step S609A, Location "Z" does not contain an address of a software modification to be made. Otherwise (S608:NO), the step S609 is not executed and the routine ends.

However, in the modified software routine, marks M2 and M3 are displayed in the external LCD 27, instead of mark M4, when the exposure compensation mode is set. The operation of the modified mode indication routine will be described below.

Thus, the first software management routine is called in step S601. In this case, the return address of the stack level 1 is the ROMADD corresponding to the location "Y". Further, the ROMADD of the sixth software modification also corresponds to the location "Y". Therefore, in step S203, the return address ADR has the ROMADD corresponding to the location "Y". In step S208, COUNT is set equal to 6 (the number of the software modification). Then steps 209 through S212 are repeated until [PTR] is equal to ADR in step S210.

Then, after clearing ADR in step S213, setting the MBE flag to be equal to 1 in step S214, and incrementing PTR by two in step S215, step S216 determines whether [PTR] is equal to 0xxXh. In this case, [PTR] is 6812h, and therefore, control proceeds to step 218. At step S218, the sixth software modification routine is copied from the EEPROM 8 to the RAM 7a of the CPU 7. Then in step S219, the sixth software modification is executed.

Figure 19:
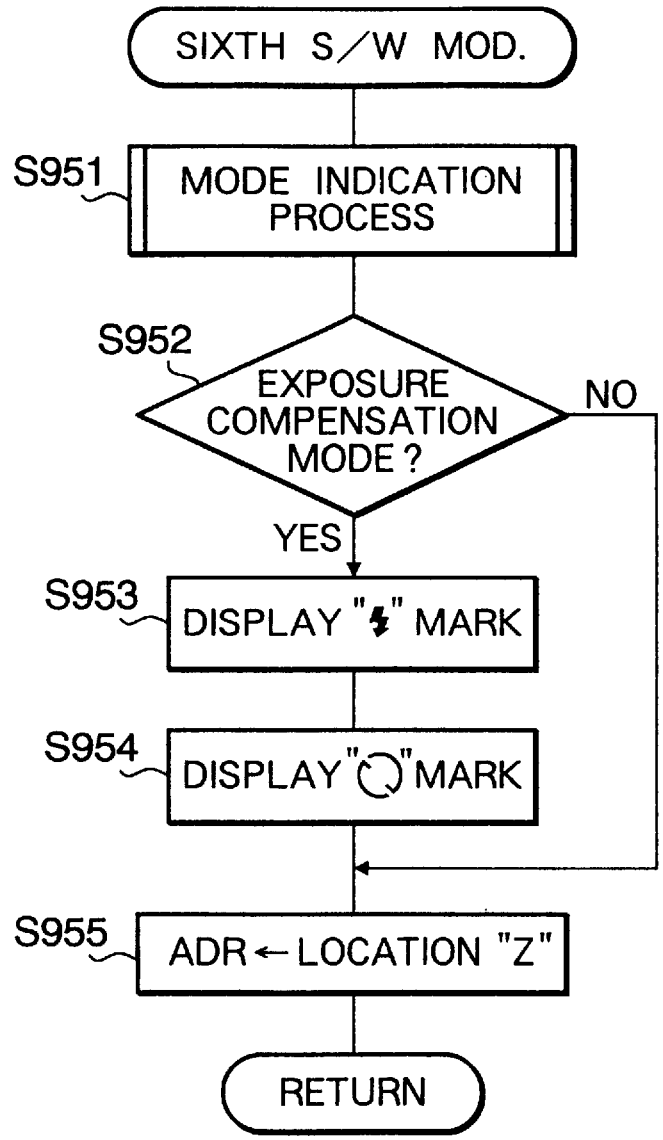
FIG. 19 shows a flowchart of a sixth software modification.

FIG. 19 shows a flowchart of a sixth software modification routine, which is used to modify the mode indication process.

In step S951, the mode indication process which is currently being executed is called again.

Thus, the first software modification management routine is called again, in step S601. However, the MBE flag is equal to 1, and therefore the routine ends (S201:YES) and returns to the ROMADD corresponding to the location "Y". Then steps S602 through S609 are executed as described above, and then control returns to step S952.

Step S952 determines whether the exposure compensation mode has been set. If the exposure compensation mode is set (S952:YES), then mark M3 is displayed on the external LCD in step S953, and mark M2 is displayed in step S954. Therefore, when the exposure compensation mode is set the indication on the external LCD 27 is modified to display marks M2 and M3.

Then in step S955, the ROMADD corresponding to the location "Z" is stored in the memory ADR. If the exposure compensation mode was not set (S952:NO), then steps S953 and S954 are skipped.

Control then returns to step S220 in the first software modification management routine, where the resident data is read from the EEPROM 8, and stored at the addresses 0280h through 02B7h of the RAM 7a. Then in step S225, the ROMADD corresponding to the location "Y" stored in the stack level 1 is replaced with the ROMADD corresponding to the location "Z" stored in the memory ADR. Thereafter, control returns to the ROMADD corresponding to the location "Z" in the mode indication routine. Thus, steps S602 through S609 are skipped (i.e., steps S602 through S609 are not executed for a second time) and the routine ends.

Figure 20:
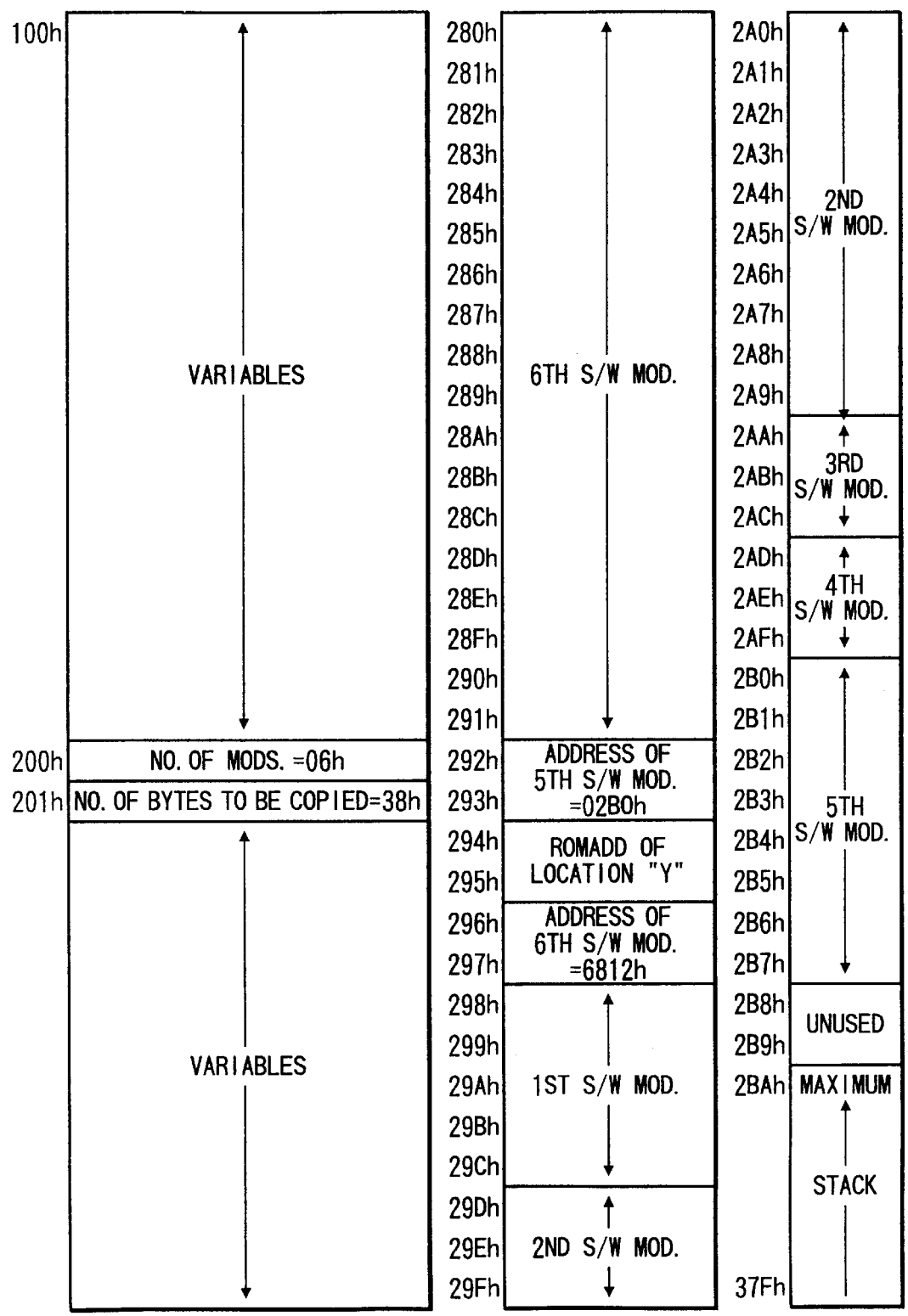
FIG. 20 shows data stored at various addresses in a RAM of the electronically controlled camera shown in FIG. 1 after a sixth software modification has been performed.

FIG. 20 is a map of the RAM 7a after the sixth software modification routine is executed. As shown in FIG. 20, the sixth software modification routine is copied into the addresses 0280h through 0291h.

As described above the mode indication process is modified, and further, after the modification, re-execution of this process is prevented.

Since software including the sixth software modification routine is called recursively, an effect similar to the executing of the first modification management process at the end of the process is achieved. Further, re-execution of the original process is prevented.

The software modification routine 6 does not need to be operated quickly, and therefore it can be made non-resident and copied to the RAM 7a when required. Further, many software routines can be made non-resident, and therefore, even if there is not sufficient stack area in the RAM 7a, the number of software routines does not need to be limited.

According to the camera 1 of the present invention, when one of the first or second modification management process is called, the software to be executed (or not to be executed) is determined in accordance with the address information (i.e., the return address and the insertion point of the modifying software). By inserting one of the modification management routines in a software routine, the software engineer can write software in which various modifications are possible at the positions where the modification management routines are provided.

Thus, according to the present invention, it is not necessary to develop a new single chip microcomputer having the modified software routines. Instead, substantially the same operations can be achieved by writing only the modification information, and the modified software routines in the EEPROM 8.

Therefore, any defects in the software can be corrected easily, and the function of the camera can be improved or upgraded easily.

As described above, the software modification routines and the modification information are divided into resident data and non-resident data. The resident data is always stored in the RAM 7a, and the non-resident data is copied to the RAM 7a from the EEPROM only when it is to be executed. Therefore, the RAM 7a of the single chip microcomputer is more efficiently used.

Further, the number of the software modification routines is not limited by the size of the RAM 7a. In other words, software modification routines can be added as desired without replacing the RAM 7a with a RAM 7a having a higher data capacity.

The resident and non-resident data may be categorized in accordance with the following standard.

The software modification routines which are required to be executed within a short period of time, should be made the resident data. Then, the software modification routines can be executed as soon as they are called. Conversely, the software modification routines which do not need to be executed within a short period of time can be stored as the non-resident data. When the non-resident data is called, it is first copied from the EEPROM to the RAM 7a and then executed. Therefore, the non-resident data cannot be executed as soon as it becomes necessary.

Further, long software modification routines should be stored as non-resident data, thereby allowing shorter software modification routines to be stored as resident data. This also increases the efficiency of the usage of the RAM 7a.

Furthermore, in the camera 1, the software modification routines which correspond to the non-resident data which are copied to the RAM 7a, are removed from the RAM 7a, during the initialization process. Thus, the resident data is again copied into the RAM 7a, and therefore, the software modification can be repeatedly executed.

In the embodiment, in the second software modification management process, the address information is obtained form the second nesting level in the stack area. Therefore, by inserting a step of calling the second modification management process at a certain portion of a main routine or subroutine, a desired software modification routine can be added at the step at which the general subroutine is called. Therefore, by designing the original software to utilize a software modification management routine, the efficiency of the ROM 7b can be increased, since additional software features or routines can be added as required using an EEPROM and the RAM 7a.

As described above, the fifth and sixth software modification routines have a function to designate or change the return address. Thus, by executing these software modification routines, some portions of the original software are effectively deleted or modified. Therefore, various changes in the function of the original control program can be made by adding the software modification routines. This enhances the overall performance of the electronic device.

In the camera 1, while a software modification routine is being executed, the same software is prohibited from being executed again. That is, when a software modification routine is called in a modification management process, and at the same time the software is being executed, if the modification management process is called again, the software modification routine which is called recursively, is not executed (i.e., returns without doing anything). Therefore, in the software modification routine, the original software to which the modification is applied can be executed.

If a step of calling the modification management process is provided in a software (subroutine), by calling the subroutine in the software modification routine, and changing the return address, the effect of having the step of calling the modification management process in the subroutine moved to another place, can be obtained. This expands the possibility of the modification of the software.

In the embodiment, the return address is obtained from the first or second nesting level in the stack. However, the present invention is not limited to the description disclosed herein, and may be modified such that the return address is obtained from a third or higher nesting level in the stack.

The programmable electronic device according to the present invention in which the program used to operate the electronic device, can be modified, is applicable to any kind of electronic device, such as electronic cameras, still video cameras, video cameras, or TV cameras, and various office instruments, home electronic devices, industrial electronic devices, as well as personal microcomputers.

According to the present invention, at predetermined portions of a program, desired software modifications can be added. Therefore, a program of an electronic device can be easily modified without the need to replace the microcomputer with another microcomputer having the modified program. Thus, new features may be added to the software or errors in the original software can be easily fixed. When applied to physically small electronic devices such as cameras, the present invention facilitates easy software upgrading of the device and any software malfunctions can be fixed quickly.

Further, it is possible to determine whether a software modification exists for a certain operational process in accordance with the address information and the modification information stored in the EEPROM. Then if the corresponding program exists, the software modification is executed. Therefore, it is possible to modify the original program by writing only the modification information and the corresponding software modification programs. Further, the number of the software modification routines is only limited by the capacity of the memory.

Furthermore, only a few steps are required to call the software modification routines, and therefore, the speed at which the software modification routines can be executed is increased.

The present disclosure relates to subject matters contained in Japanese Patent Application No. HEI 7-100478 filed on Mar. 31, 1995 and Japanese Patent Application No. HEI 7-100479 filed on Mar. 31, 1995, which are expressly incorporated herein by reference in their entireties.

What is claimed is:

1. An electronically controlled camera comprising:
   a read only memory (ROM), said ROM storing a control program to control operations of said camera, said control program being provided with a transfer point to call a software modification management routine;
   an electrically erasable programmable read only memory (EEPROM), said EEPROM storing at least one modifying program for modifying said control program, and for storing modification information related to a modification of said control program;
   a random access memory (RAM), said RAM storing said at least one modifying program and said modification information; and
   a controller, said controller determining whether said at least one modifying program is present in said EEPROM in accordance with said modification information and address information indicating a current operating position of said control program, said address information including a return address for returning to said control program after execution of said modification management routine, said controller executing said control program and said at least one modifying program upon determining that said modifying program is present in said EEPROM, said controller further determining whether said at least one modifying program is resident data or non-resident data and copying said at least one modifying program from said EEPROM to said RAM during an initialization routine for execution if said control determines that said at least one modifying program is resident data, and said controller copying said at least one modifying program to a location of said RAM where said resident data has been stored when said controller determines said at least one modifying program is non-resident data.

2. The electronically controlled camera according to claim 1, wherein said modification information comprises modifying program position information related to a location at which said at least one modifying program is to be added, and wherein said controller determines that said at least one modifying program is present if an address indicated by said modifying program location information is coincident with the address of said address information.

3. The electronically controlled camera according to claim 1, wherein said transfer point is called from a plurality of operating positions of said control program, and wherein said software modification management routine executes said at least one modifying program at predetermined ones of said plurality of operating positions.

4. The electronically controlled camera according to claim 1, said modifying program designating said return address of said control program, and wherein said software modification management routine changes said return address in accordance with said return address designated by said modifying program.

5. The electronically controlled camera according to claim 1, wherein said controller prohibits said at least one modifying program from being re-executed while said at least one modifying program is being executed.

6. The electronically controlled camera according to claim 1, wherein if said at least one modifying program is non-resident data, said controller recopies said resident data to said location of said RAM where said at least one modifying program has been copied, after said at least one modifying program has been executed by said controller.

7. The electronically controlled camera according to claim 1, wherein said controller copies said at least one modifying program to a location of said RAM where said resident data has been stored immediately prior to execution of said at least one modifying program by said controller when said controller determines said at least one modifying program is non-resident data.

8. The electronically controlled camera according to claim 4, wherein if said modifying program is called from a subroutine within said control program, said return address designated by said at least one modifying program is an address of said subroutine.

9. The electronically controlled camera according to claim 5, wherein said controller prohibits re-execution of said at least one modifying program by changing said return address to said control program.

10. An electronically controlled camera comprising:
    first means for storing a control program for controlling operations of said camera, said control program being provided with a transfer point to call a software modification management routine;
    second means for storing at least one modifying program for modifying said control program, and for storing modification information related to a modification of said control program;
    third means for storing said at least one modifying program and said modification information;
    means for ascertaining whether said at least one modifying program is present in said second means in accordance with said modification information and address information indicating a current operating position of said control program, said address information including a return address for returning to said control program after execution of said modification management routine;
    means for determining if said at least one modifying program is resident data or non-resident data;
    means for copying said at least one modifying program from said second means to said third means during an initialization routine for execution if said determining means determines that said at least one modifying program is resident data;
    means for copying said at least one modifying program from said second means to a location in said third means where said resident data has been stored when said determining means determines said at least one modifying program is non-resident data; and
    means for executing said control program and said at least one modifying program upon determining that said modifying program is present in said second means.

11. The electronically controlled camera according to claim 10, wherein said modification information comprises modifying program position information related to a location at which said at least one modifying program is to be added, and wherein said ascertaining means determines that said at least one modifying program is present if an address indicated by said modifying program location information is coincident with the address of said address information.

12. The electronically controlled camera according to claim 10, wherein said transfer point is called from a plurality of operating positions of said control program, and wherein said executing means executes said software modification management routine and said at least one modifying program at predetermined ones of said plurality of operating positions.

13. The electronically controlled camera according to claim 10, further comprising means for changing said return address of said control program, wherein said modifying program designates a return address of said control program, and wherein said changing means changes said return address designated by said software modification management routine in accordance with said return address designated by said modifying program.

14. The electronically controlled camera according to claim 10, further comprising means for prohibiting said executing means from re-executing said at least one modifying program while said at least one modifying program is being executed by said executing means.

15. The electronically controlled camera according to claim 10, said first means comprising a ROM, said second means comprising an EEPROM, and said third means comprising a RAM.

16. The electronically controlled camera according to claim 10, wherein if said at least one modifying program is non-resident data, said copying means recopies said resident data to said location of said third storing means where said at least one modifying program has been copied, after said at least one modifying program has been executed by said executing means.

17. The electronically controlled camera according to claim 10, said means for copying said at least one modifying program from said second means to a location in said third means where said resident data has been stored copying said at least one modifying program immediately prior to execution by said executing means when said determining means determines said at least one modifying program is non-resident data.

18. The electronically controlled camera according to claim 13, wherein if said modifying program is called from a subroutine within said control program, said return address designated by said modifying program is an address of said subroutine.

19. The electronically controlled camera according to claim 14, wherein said prohibiting means prohibits re-execution of said executing means by changing said return address to said control program.

20. A method of controlling an electronically controlled camera, the camera comprising a read only memory (ROM), an electrically erasable programmable read only memory (EEPROM), a random access memory (RAM), and a controller, the method comprising:

storing a control program for controlling operations of the camera in the ROM, the control program being provided with a transfer point to call a software modification management routine;

storing at least one modifying program for modifying the control program in the EEPROM, and storing modification information related to a modification of the control program;

storing the at least one modifying program and the modification information in the RAM;

ascertaining whether the at least one modifying program is present in the EEPROM in accordance with the modification information and address information indicating a current operating position of the control program, said address information including a return address for returning to said control program after execution of said modification management routine;

determining if the at least one modifying program is resident data or non-resident data;

copying the at least one modifying program from the EEPROM to the RAM during an initialization routine for execution upon determining that the at least one modifying program is resident data;

copying the at least one modifying program from the EEPROM to a location in the RAM where the resident data has been stored upon determining that the at least one modifying program is non-resident data; and executing the control program, the modification management routine, and the at least one modifying program upon determining that the modifying program is present in the EEPROM.

21. The method according to claim 20, wherein the modification information comprises modifying program position information related to a location at which the at least one modifying program is to be added, and wherein the ascertaining step comprises determining if the at least one modifying program is present based on an address indicated by the modifying program location information being coincident with the address of the address information.

22. The method according to claim 20, wherein the executing step comprises returning to the control program after executing the modification management routine.

23. The method according to claim 20, wherein the transfer point is called from a plurality of operating positions of the control program, and wherein the executing step comprises calling the software modification management routine and the at least one modifying program at predetermined ones of the plurality of operating positions.

24. The method according to claim 23, wherein the executing step comprises returning to the control program after executing the modification management routine.

25. The method according to claim 20, further comprising changing a return address of the control program designated by the software modification management routine in accordance with a return address designated by the modifying program.

26. The method according to claim 20, further comprising prohibiting re-executing the at least one modifying program while the at least one modifying program is being executed during the executing step.

27. The method according to claim 20, further comprising recopying said resident data to said location of said RAM where the at least one modifying program has been copied, after executing the at least one modifying program if the at least one modifying program is determined to be non-resident data.

28. The method according to claim 20, wherein the copying the at least one modifying program from the EEPROM to a location in the RAM where the resident data has been stored is performed immediately prior to executing the at least one modifying program upon determining that the at least one modifying program is non-resident data.

29. The method according to claim 22, further comprising executing a subroutine program with said control program, wherein executing the at least one modifying program comprises returning to an address of the subroutine program after executing the modification management routine.

30. The method according to claim 24, further comprising executing a subroutine program of said control program, wherein executing the at least one modifying program comprises returning to an address of the control program after executing the modification management routine.

31. The method according to claim 26, wherein prohibiting re-execution of the at least one modifying program is performed by changing said return address to the control program.

* * * * *